US 6,618,498 B1

United States Patent
Nakayama

(10) Patent No.: US 6,618,498 B1
(45) Date of Patent: Sep. 9, 2003

(54) IMAGE PROCESSING COMPUTER SYSTEM FOR PHOTOGRAMMETRIC ANALYTICAL MEASUREMENT

(75) Inventor: Toshihiro Nakayama, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/610,958

(22) Filed: Jul. 6, 2000

(30) Foreign Application Priority Data

Jul. 7, 1999 (JP) ............................. P11-192940

(51) Int. Cl.⁷ ............................................. G06K 9/00
(52) U.S. Cl. ........................ 382/154; 382/103; 382/106
(58) Field of Search ....................... 382/103, 154, 382/285, 286, 209, 153, 151, 106; 348/42, 47, 48, 50, 148; 356/3, 3.01, 12, 14; 702/42, 152, 159, 150, 151, 158, 153

(56) References Cited

U.S. PATENT DOCUMENTS

| | | | |
|---|---|---|---|
| 5,699,444 A | 12/1997 | Palm ........................... | 382/106 |
| 5,995,765 A | 11/1999 | Kaneko et al. ................ | 396/89 |
| 6,108,497 A | 8/2000 | Nakayama et al. ......... | 396/429 |
| 6,144,761 A * | 11/2000 | Kaneko et al. .............. | 382/154 |
| 6,304,669 B1 * | 10/2001 | Kaneko et al. .............. | 382/154 |
| 6,442,293 B1 * | 8/2002 | Ito et al. ...................... | 382/154 |
| 6,487,517 B2 * | 11/2002 | Sakai et al. .................. | 702/158 |

FOREIGN PATENT DOCUMENTS

| | | |
|---|---|---|
| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10253875 | 9/1998 |
| JP | 10293026 | 11/1998 |
| JP | 10307025 | 11/1998 |
| JP | 11295065 | 10/1999 |

OTHER PUBLICATIONS

English Language Abstract of JP 10–307025.
English Language Abstract of JP 10–221072.
English Language Abstract of JP 10–185563.
English Language Abstract of JP 10–185562.
English Language Abstract of JP 10–170263.
English Language Abstract of JP 10–141951.
English Language Abstract of JP 11–295065.

* cited by examiner

*Primary Examiner*—Samir Ahmed
(74) *Attorney, Agent, or Firm*—Greenblum & Bernstein, P.L.C.

(57) ABSTRACT

In an image processing computer system for a photogrammetric measurement in which a survey map is produced based on plural pictures under a three-dimensional coordinate system, a picture-arranging system rearranges the pictures to select plural pairs of pictures from among the pictures such that each pair of pictures is fixed to produce a survey map section, and a picture-connecting system successively connects the plural pair pictures to each other. A monitor displays a scene including first and second display areas. The pairs of pictures are selectively displayed on the first display area, and a pair of object points corresponding to each other on two pictures in each pair are indicated. The coordinates of an object point represented by the pair of indicated object points are calculated, and the calculated coordinates on a plane defined by the coordinate system. The projected coordinates is displayed as a point representing said object point concerned on the second display area.

4 Claims, 21 Drawing Sheets

IMAGE PROCESSING COMPUTER SYSTEM FOR PHOTOGRAMMETRIC ANALYTICAL MEASUREMENT

BACKGROUND OF THE INVENTION

1. Field of the Invention

The present invention relates to an image-processing computer system for a photogrammetric analytical measurement, in which a survey map is electronically produced based on a pair of photographed pictures obtained at two different photographing positions.

2. Description of the Related Art

For example, photogrammetry is carried out at a traffic accident spot. The traffic accident spot is photographed by an electronic still video digital camera in at least two different positions, and a survey map of the traffic accident spot is produced based on a pair of photographed pictures obtained at the different positions, as disclosed in, for example, Unexamined Japanese Patent Publications Nos. 10-221072 and No. 10-293026.

Before accurately scaled distances and lengths can be reproduced on the survey map, a standard measurement scale or target must be recorded together with the photographed objects in the pictures. The target is disclosed in, for example, Unexamined Japanese Patent Publications No.10-141951, No.10-170263, No.10-185562, No.10-185563, No.10- 293026, No.10-307025and No.11-295065.

For the production of the survey map, a two-dimensional coordinate system is defined on each of the pictures, and two-dimensional positions of the objects, which are recorded on each picture, are determined by the two-dimensional coordinate system. Also, a three-dimensional coordinate system is defined on the target, and three-dimensional positions of the recorded objects are determined based on the two-dimensional positions of the objects with respect to the three-dimensional coordinate system. Accordingly, it is possible to produce a survey map by projecting the three-dimensional coordinates, representing the objects, on one of the three planes defined by the three-dimensional system. Of course, the production of the survey map is performed using an image-producing computer system.

For example, to produce a long portion of a roadway as a survey map, it is necessary to obtain plural pairs of pictures to cover the length of the roadway, and the target must be moved from one position to another position in the length of the roadway. In this case, a survey map section is produced based on each pair of pictures, and the survey map is obtained by successively connecting the survey map sections to each other. Of course, the production of all the survey map sections must be united with respect to a single three-dimensional coordinate system defined on the target located at a previously-selected position. Thus, when the plural pairs of pictures are processed using the image-processing computer system by an operator to produce the survey map, it must be always known by the operator which target position each pair of pictures features and where each picture is photographed, resulting in facilitation of the production of the survey map. However, in reality, it is difficult to visually recognize the circumstances of a picture among other many pictures.

In any event, conventionally, it is complicated and troublesome to produce the survey map based on plural pairs of pictures.

SUMMARY OF THE INVENTION

Therefore, an object of this invention is to provide an image processing computer system for a photogrammetric analytical measurement, which is constituted such that a survey map can be effectively and easily produced based on plural pairs of pictures, resulting in facilitation of the production of the survey map.

In accordance with an aspect of the present invention, there is provided an image processing computer system for a photogrammetric analytical measurement in which a survey map is produced based on plural pictures under a common three-dimensional coordinate system defined on a target. The image processing computer system comprises: a picture-arranging system that rearranges the pictures to select plural pairs of pictures from among the pictures such that each pair of pictures is fixed to produce a survey map section; a picture-connecting system that successively connects the plural pair pictures to each other in a predetermined order; a monitor that displays a scene including a pair-picture-display area and a map-production-display area; a first monitor controller that selectively displays the plural pairs of pictures on the pair-picture-display area; an object-point indicator that indicates a pair of object points corresponding to each other on two pictures in each pair displayed on the pair-picture-display area; a calculator that calculate three-dimensional coordinates of an object point represented by the pair of object points indicated by the object-point indicator; a projector that projects the calculated three-dimensional coordinates on a plane defined by two coordinate axes of the three-dimensional coordinate system; and a second monitor controller that displays the projected three-dimensional coordinates as a point representing the object point concerned on the map-producing-display area.

Preferably, the scene of the monitor further includes a selection bar for selecting one of the plural pairs of pictures to be displayed on the pair-picture-display area.

In accordance with another aspect of the present invention, there is provided an image processing method for a photogrammetric analytical measurement in which a survey map is produced based on plural pictures under a common three-dimensional coordinate system defined on a target. The image processing method comprises the steps of: rearranging the pictures to select plural pairs of pictures from among the pictures such that each pair of pictures is fixed to produce a survey map section under a picture-arranging system; successively connecting the plural pair pictures to each other in a predetermined order under a picture-connecting system; displaying a scene, including a pair-picture-display area and a map-production-display area, on a monitor; selectively displaying the plural pairs of pictures on the pair-picture-display area under a first monitor controller; indicating a pair of object points corresponding to each other on two pictures in each pair displayed on the pair-picture-display area, using an object-point indicator; calculating three-dimensional coordinates of an object point represented by the pair of object points indicated by the object-point indicator, using a calculator; projecting the calculated three-dimensional coordinates on a plane defined by two coordinate axes of the three-dimensional coordinate system, using a projector; and displaying the projected three-dimensional coordinates as a point representing the object point concerned on the map-producing-display area, under control of a second monitor controller.

In accordance with yet another aspect of the present invention, there is provided a memory medium storing an image processing program for executing the above-mentioned image processing method.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
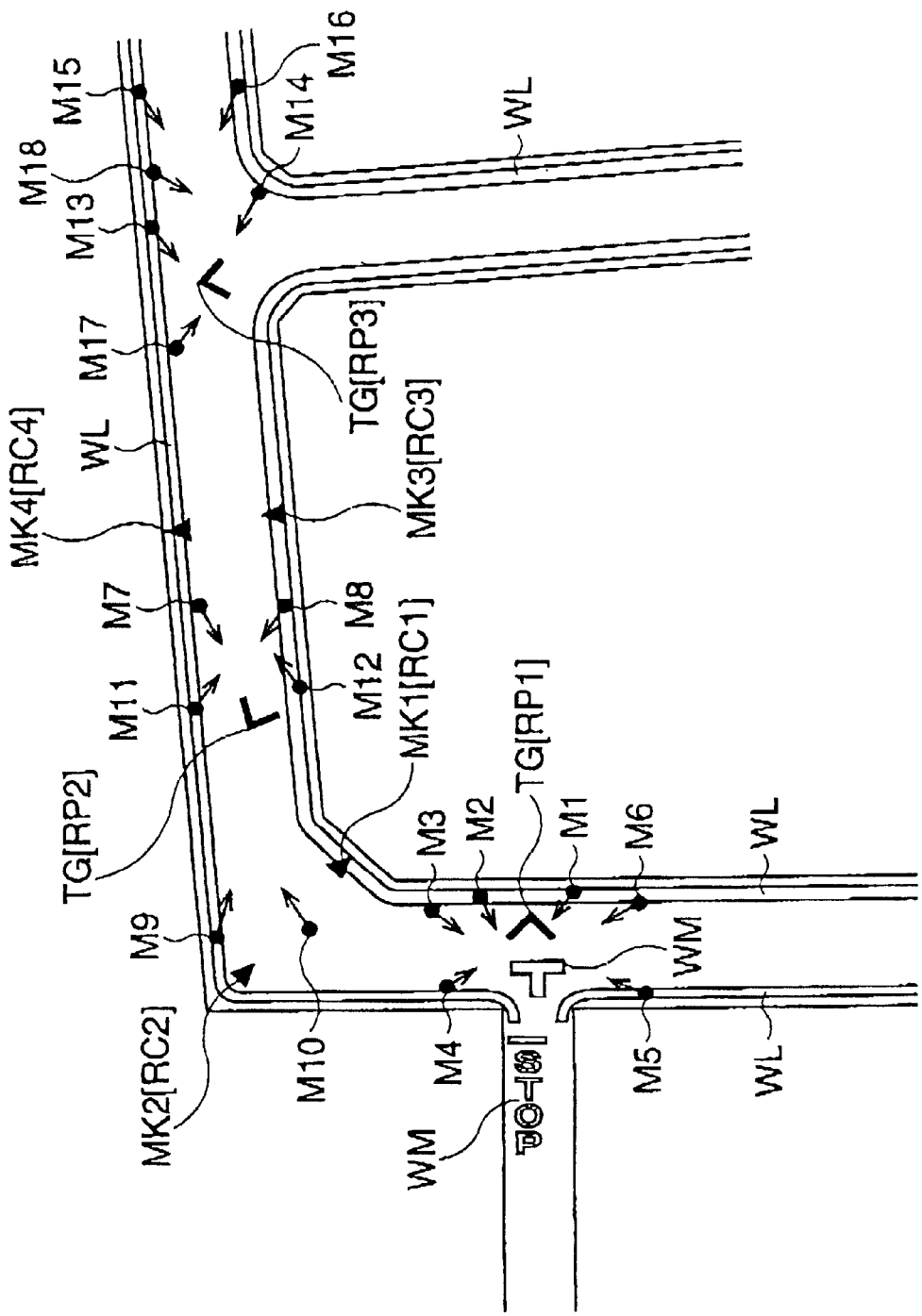
FIG. 1 is a plan view of a roadway for explaining a photogrammetric analytical measurement, which is utilized by a photogrammetric image processing computer system according to the present invention.

With reference to FIG. 1, a roadway is shown as a plan view, by way of example, for explaining a photogrammetric analytical measurement which utilizes a photogrammetric image processing computer system of the present invention. In this example, the roadway is photographed by an electronic still video digital camera 50 (FIG. 4) at eighteen photographing positions, which are represented by small solid circles indicated by references M1 to M18, respectively. Each of the eighteen pictures, photographed at the photographing positions M1 to M18, is processed by a control circuit of the digital camera 50, and is then stored as a frame of image data in a memory medium, such as an IC memory card, held in the camera 50. The memory card is loaded in the photogrammetric image processing computer system according to the present invention, and a survey map of the roadway is produced on the basis of the eighteen frames of image data read from the memory card, as stated in detail hereinafter.

Each of the photographing positions M1 to M18 is defined as a back principal point M (FIG. 4) of a photographing optical lens system of the digital camera 50. As shown in FIG. 1, an arrow is projected from each of the photographing positions M1 to M18 to indicate a photographing direction at the corresponding photographing position (M1, M2, . . . M17, M18). The photographing direction is defined as an orientation of an optical axis of the photographing optical lens system of the digital camera 50.

The eighteen photographing operations are performed in the order of the photographing positions M1 to M18. Also, when each of the photographing operations is performed, an object to be surveyed is photographed together with a target, indicated by reference TG (FIG. 4), which serves as a standard measurement scale. In FIG. 1, although three targets TG are shown, only one target TG is used. Respective bracketed references RP1, RP2 and RP3, appended to the references TG, represents target positions at which the target TG is to be located.

In the example of FIG. 1, the target TG is initially located at the first target positions RP1, and the first, second, third, fourth, fifth and sixth photographing operations are performed at the positions M1 to M6. After the completion of the sixth photographing operation, the target TG is moved from the first target position RP1 to the second target position RP2, and the seventh, eight, ninth and tenth photographing operations are performed at the positions M7 to M10. After the completion of the tenth photographing operation, the target TG is further moved from the second target position RP2 to the third target position RP3, and the eleventh, twelfth, thirteenth, fourteenth, fifteenth, sixteenth, seventeenth and eighteenth photographing operations are performed at the positions M11 to M18.

The target TG is provided with a movement sensor for detecting the movement of the target TG, as disclosed in Unexamined Japanese Patent Publication No. 11-295065, and a tilt-angle sensor for detecting a tilt-angle of the target TG, as disclosed in Unexamined Japanese Patent Publication No. 10-185563. Whenever the target TG is moved from one position to another position, the movement sensor detects a movement of the target between the two positions, and outputs a signal representing the movement of the target TG. The tilt-angle sensor detects a tilt-angle of the target TG to a horizontal plane when being located on the roadway, and outputs a tilt-angle signal representing the detected tilt-angle.

The target TG is further provided with a signal processor for processing the respective signals output from the movement sensor and the tilt-angle sensor, and a radio transmitter for transmitting the processed signals to a receiver provided in the camera 50. The transmission of the signals from the radio transmitter is repeated at regular intervals of very short time. Whenever a photographing operation is performed by the camera 50, and the transmitted signals are retrieved from the receiver by the control circuit of the camera 50. The retrieved signals are processed by the control circuit of the camera 50, and are then stored in the memory card, together with a corresponding frame of image data obtained by the photographing operation.

An object to be surveyed is twice photographed by the camera 50 at two different photographing positions and in two different photographing directions. Namely, the two photographing operations are consecutively performed by the camera 50 with respect to the object to be surveyed, and a pair of pictures, on which the object to be surveyed is recorded, is obtained by the two consecutive photographing operations.

In particular, while the target TG is located at the first target position RP1, a first pair of pictures is obtained by the consecutive first and second photographing operations at the positions M1 and M2, a second pair of pictures is obtained by the consecutive third and fourth photographing operations at the positions M3 and M4, and a third pair of pictures is obtained by the consecutive fifth and sixth photographing operations M5 and M6. The first, second and third pairs of pictures form a first group of pictures featuring the first target position RP1.

Also, while the target TG is located at the second target positions RP2, a fourth pair of pictures is obtained by the consecutive seventh and eighth photographing operations at the positions M7 and M8, and a fifth pair of pictures is obtained by the consecutive ninth and tenth photographing operations at the positions M9 and M10. The fourth and fifth pairs of pictures form a second group of pictures featuring the second target positions RP2.

Further, while the target TG is located at the third target position RP3, a sixth pair of pictures is obtained by the consecutive eleventh and twelfth photographing operations at the positions M11 and M12, a seventh pair of pictures is obtained by the consecutive thirteenth and fourteenth photographing operations at the positions M13 and M14, an eighth pair of pictures is obtained by the consecutive fifteenth and sixteenth photographing operations M15 and M16, and a ninth pair of pictures is obtained by the consecutive seventeenth and eighteenth photographing operations at the positions M17 and M18. The sixth, seventh, eighth and ninth pairs of pictures form a third group of pictures featuring the third target position RP3.

In order for the production of the survey map of the roadway, nine survey map sections are produced on the basis of the first, second, third, fourth, fifth, sixth, seventh, eighth and ninth pairs of pictures, respectively, and then are successively connected to each other.

For the connection between one of the first, second and third survey map sections, derived from the first group of pictures, and one of the fourth and fifth survey map sections, derived from the second group of pictures, a first set of markers MK1 and MK2 is located between the first and second target positions RP1 and RP2, and the first set of markers MK1 and MK2 is photographed in at least one pair of pictures, included in the first group of pictures, and in at least one pair of pictures, included in the second group of pictures.

Similarly, for the connection between one of the fourth and fifth survey map sections, derived from the second group of pictures, and one of the sixth, seventh, eighth and ninth survey map sections, derived from the third group of pictures, a second set of markers MK3 and MK4 is located between the second and third target positions RP2 and RP3, and the second set of markers MK3 and MK4 is photographed in at least one pair of pictures, included in the second group of pictures, and in at least one pair of pictures, included in the third group of pictures.

In FIG. 1, respective bracketed references RC1 and RC2, appended to the references MK1 and MK2, represent connection points for connecting two survey map sections derived from the first and second groups of pictures. Similarly, respective bracketed references RC3 and RC4, appended to the references MK3 and MK4, represent connection points for connecting two survey map sections derived from the second and third groups of pictures.

In FIG. 1, although each of the markers MK1, MK2, MK3 and MK4 is shown as a small solid triangle, it may comprise a cone-shaped marker. In this case, the connection point (RC1, RC2, RC3, RC4) is represented by an apex of the cone-shaped marker.

In the example of FIG. 1, a single set of markers may be used for the two sets of markers, (MK1 and MK2; MK3 and MK4). Of course, in this case, the single set of markers are initially located between the first and second target positions RP1 and RP2, and is then moved to a location between the second and third target positions RP2 and RP3 after the photographing operations for the second group of pictures are completed.

Note, in FIG. 1, references WL indicate white lines painted along the sides of the roadway, and references WM indicate white traffic symbols pointed on the roadway.

Figure 2:
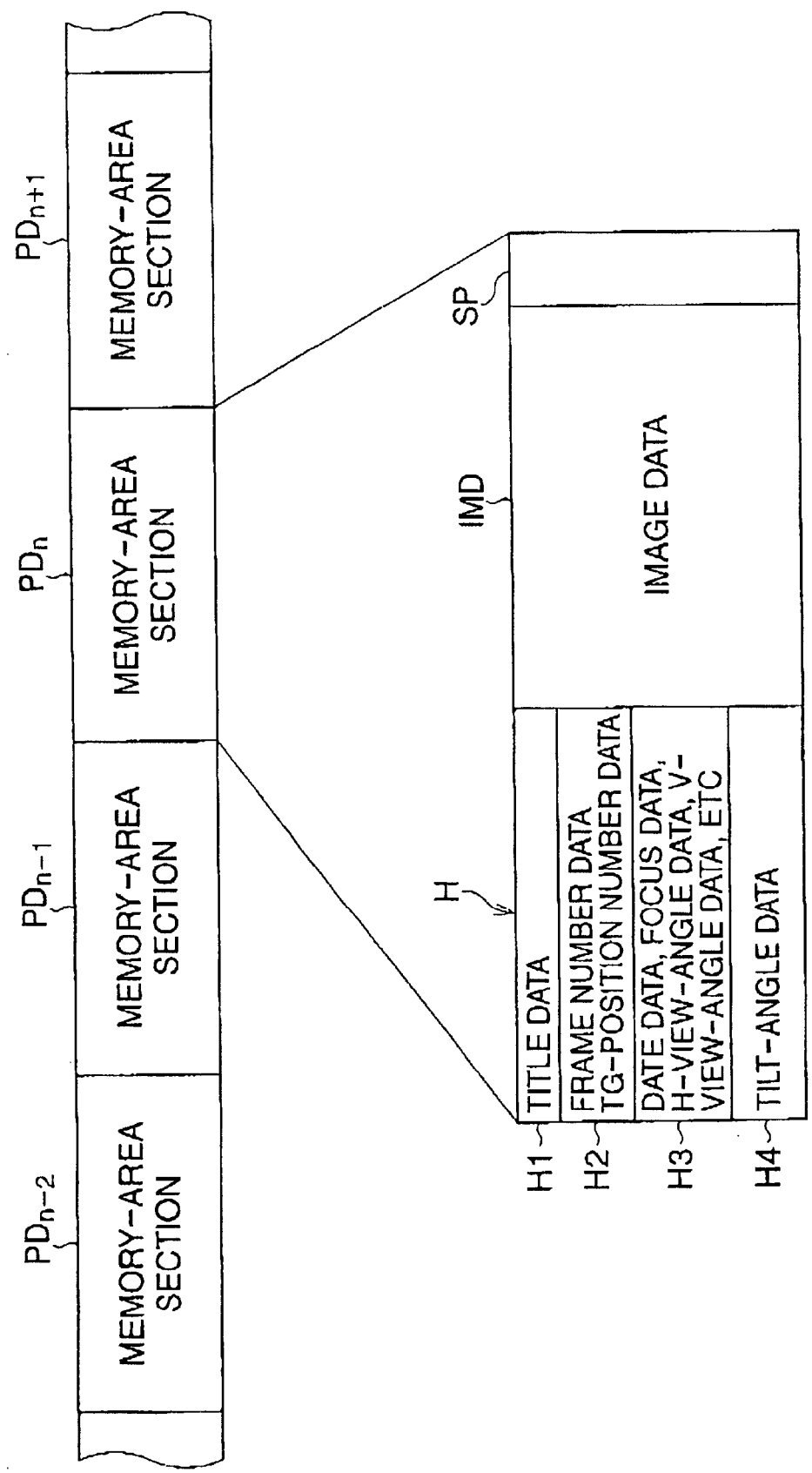
FIG. 2 is a conceptual schematic view showing an example of a format of a memory card, which is detachably held in an electronic still video digital camera utilized in the photogrammetric analytical measurement, and which is loaded in the photogrammetric image processing computer system according to the present invention.

FIG. 2 conceptually shows a format of the IC memory card held in the camera 50. As shown in this drawing, a memory-area of the memory card is sectioned into a plurality of memory-area sections, some of which are indicated by references $PD_{n-2}$, $PD_{n-1}$, $PD_n$ and $PD_{n+1}$, and each of the memory-area sections ($\ldots$, $PD_{n-2}$, $PD_{n-1}$, $PD_n$ and $PD_{n+1}$, $\ldots$) includes an image area IMD, a header area H and a margin area SP. Of course, the image area IMD is provided for storing a frame of image data representing a photographed picture. The header area H is sectioned into subheader areas H1, H2, H3 and H4 for storing various particular data concerning the photographed picture. The margin area SP is provided for distinguishing between the two adjacent memory-area sections $PD_n$ and $PD_{n+1}$.

The subheader areas H1 is provided for storing a title data of the photographed picture, and the title data is input by manipulating character-inputting-switch buttons provided on a camera body of the camera 50, if necessary.

The subheader area H2 is provided for storing two kinds of number data: a frame number data representing a photographing order and a target-position number data representing a target-position (RP1, RP2, RP3) of the target TG.

For the frame number data, a frame number counter is defined in the control circuit of the camera 50, and, for example, is initially set to be "0". Whenever a photographing operation is performed by the camera 50, the frame number counter is incremented by "1", and is stored as the frame number data in a corresponding subheader area H2. For example, when the first photographing operation is completed at the position M1, the frame number data is stored as "1" in the subheader area H2 of the first memory-area section $PD_1$, and when the eighteenth photographing operation is completed at the position M18, the frame number data is stored as "18" in the subheader area H2 of the eighteenth memory-area section $PD_{18}$.

For the target-position number data, a target-position-number counter is defined in the control circuit of the camera 50, and, for example, is initially set to be "1". Whenever a movement of the target TG from one position to another position is confirmed by detecting the movement-signal transmitted from the radio transmitter of the target TG, the target-position-number counter is incremented by "1", and, whenever a photographing operation is completed by the camera 50, a count number data of the target-position-number counter data is stored as the target-position number data in a corresponding subheader area H2. Thus, when each of the first, second, third, fourth, fifth and sixth photographing operations is completed, the target-position number data is stored as "1" in the subheader area H2 of each memory-area section ($PD_1$, . . . , $PD_6$). Also, when each of the seventh, eighth, ninth and tenth photographing operations is completed, the target-position number data is stored as "2" in the subheader area H2 of each memory-area section ($PD_7$, . . . , $PD_{10}$). Further, when each of the eleventh, twelfth, thirteenth, fourteenth, fifteenth, sixteenth, seventeenth and eighteenth photographing operations is completed, the target-position number data is stored as "3" in the subheader area H2 of each memory-area section ($PD_{11}$, . . . , $PD_{18}$).

In short, the photographed pictures, included in the first group, are featured by "1" as the target-position number data; the photographed pictures, included in the second group, are featured by "2" as the target-position number data; and the photographed pictures, included in the third group, are featured by "3" as the target-position number data.

The subheader area H3 is provided for storing a photographing date data, a focus-distance data, a horizontal view-angle data, a vertical view-angle data, a resolving-power data of a CCD (charge-coupled device) image sensor, used in the camera 50, and so on. These data are automatically stored in the subheader area H3 by the control circuit of the camera 50 whenever a photographing operation is completed.

The subheader area H4 is provided for storing the tilt-angle data of the target TG, which are derived from a tilt-angle signal transmitted from the radio transmitter of the target TG. Namely, whenever a photographing operation is performed by the camera 50, the tilt-angle signal is retrieved from the receiver by the control circuit of the camera 50, and the retrieved signal is processed by the control circuit of the camera 50, thereby producing the tilt-angle data to be stored in the subheader H4.

Figure 3:
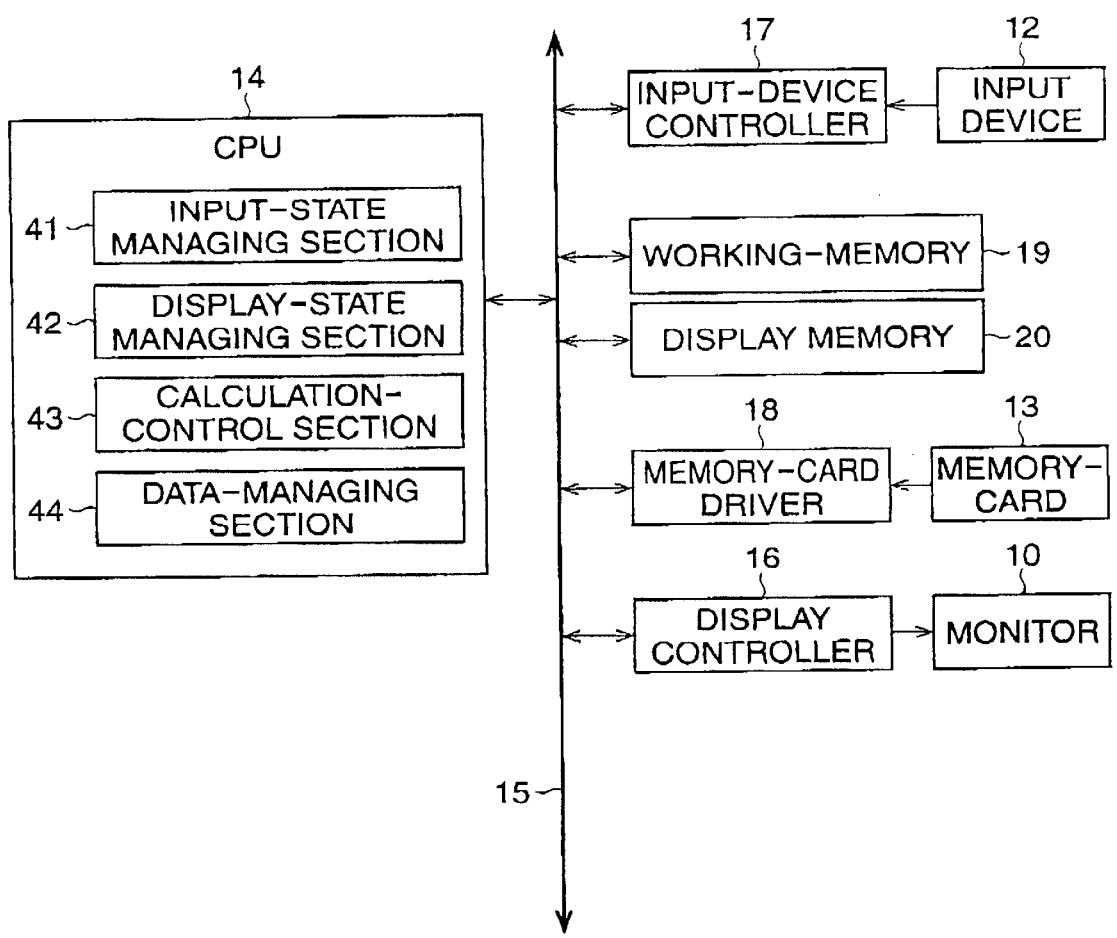
FIG. 3 is a block diagram of the photogrammetric image processing computer system according to the present invention.

With reference to FIG. 3, the photogrammetric image processing computer system according to the present invention is shown as a block diagram.

The image processing computer system comprises: a central processing unit (CPU) 14; a display device 10, such as a CRT monitor, a display controller 16 for controlling the monitor 10; a display memory 20 for storing image data on which a scene to be displayed on the monitor 10 is based; an input device 12 including a keyboard and a mouse; an input-device controller 17 for controlling the input device 12; a memory-card driver 18 for loading the memory card, indicated by reference 13; and a working memory 19 used as a cash memory when executing calculations and processing in the CPU 14. The input-device controller 17, the working memory 19, the display memory 20, the memory-card driver 18 and the display controller 16 are connected to the CPU 14 via a bus 15.

As conceptually shown in FIG. 3, the CPU 14 includes an input-state managing section 42, a display-state managing section 42, a calculation-control section 43, and a data-managing section 44.

The input-state managing section 41 manages various information data and command data input through the input device 12. For example, when a cursor or pointer is moved on a scene of the monitor 10 by manipulating the mouse of the input device 12, the movement of the pointer is managed by the input-state managing section 41. Also, but the input-state managing section 41, it is monitored whether character code data is input through the keyboard of the input device 12, and, when the character code data is input, the character code data is converted into character image data, which is output to the display memory 20, whereby character images are displayed on the scene of the monitor 10.

The display-state managing section 42 manges a scene to be displayed on the monitor 10. For example, when at least a part of the scene displayed on the monitor 10 is changed, the change of the scene is managed by the display-state managing section. Namely, writing of image data in the display memory 20 is controlled by the display -state managing section 42, thereby changing the scene displayed on the monitor 10. The display controller 16 repeatedly reads the image data from the display memory 20 at a regular interval of given short time, and converts the read image data into a three primary (red, green and blue) video data.

The calculation-control section 42 executes various calculations, thereby producing a survey map of the roadway, as stated in detail hereinafter.

The data-managing section 44 manges various data read from the memory card 13 through the memory-card driver 18, survey map data, various data necessary for producing the survey map data and so on.

After the eighteen photographing operations are completed by the camera 50 at the photographing positions M1 to M18, as shown in FIG. 1, the memory card 13 is removed from the camera 50, and is then loaded in the memory-card driver 18. Of course, the loaded memory card 13 stores the eighteen frames of image data obtained by the eighteen photographing operations performed at the positions M1 and M18.

The eighteen frames of image data are read from the memory card 13 through the memory-card driver 18, and are once stored in the working-memory 19. Then, each of the eighteen photographing positions M1, M2, . . . , M17 and M18 is spatially determined with respect to the target TG on the basis of the corresponding frame of image data.

Figure 4:
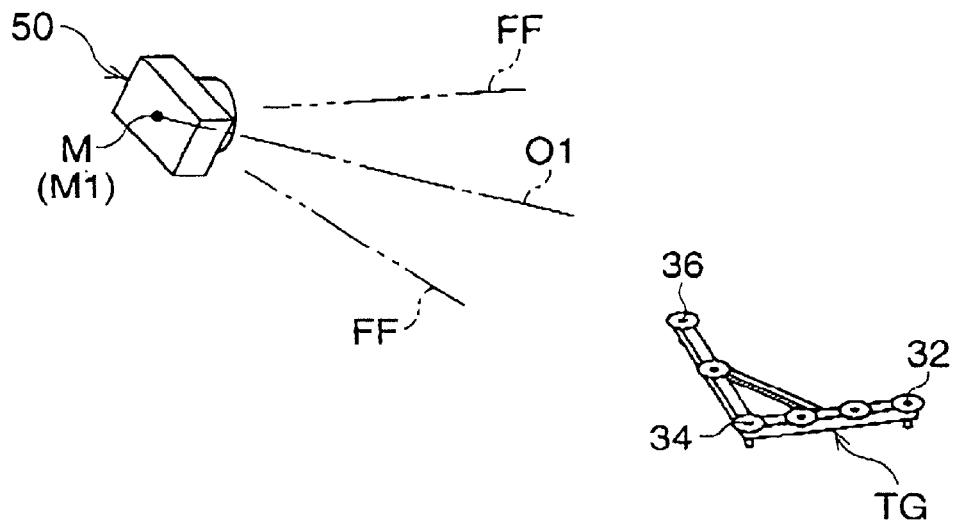
FIG. 4 shows a conceptual perspective view showing a positional relationship between the camera and a target when performing a photographing operation at a first photographing position.
Figure 5:
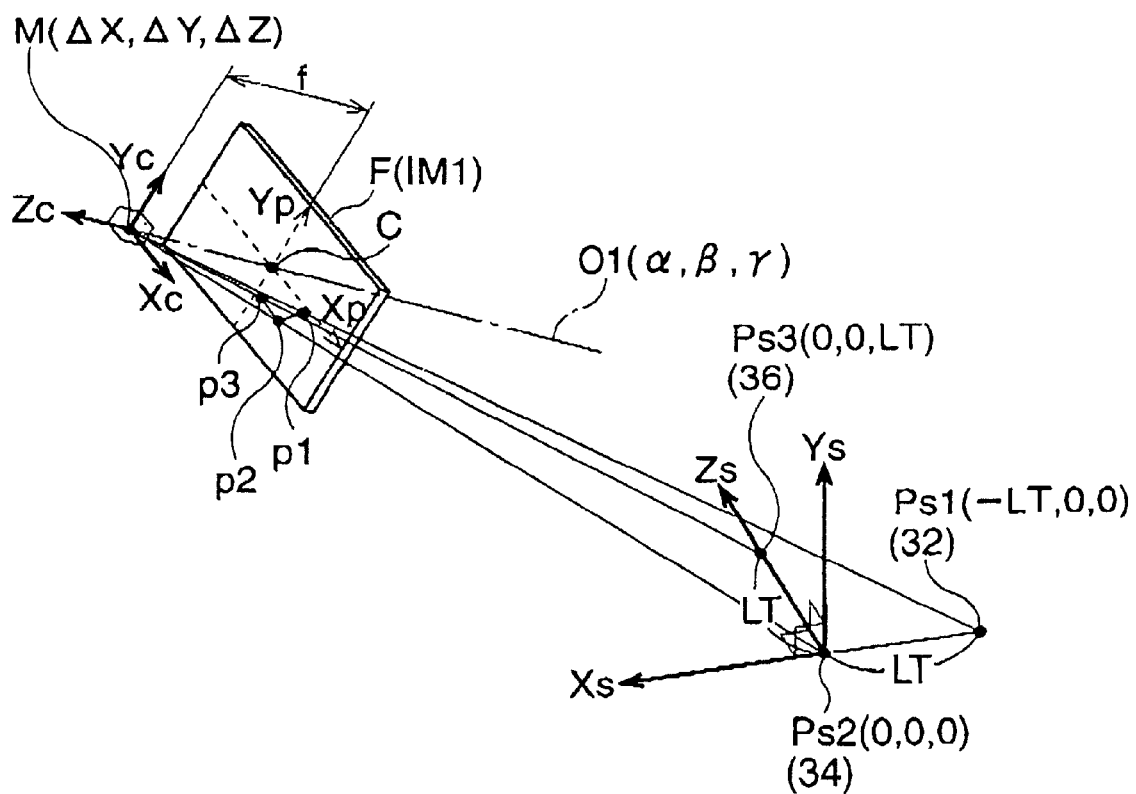
FIG. 5 is a geometrical and conceptual illustration of the positional relationship shown in FIG. 4.
Figure 6:
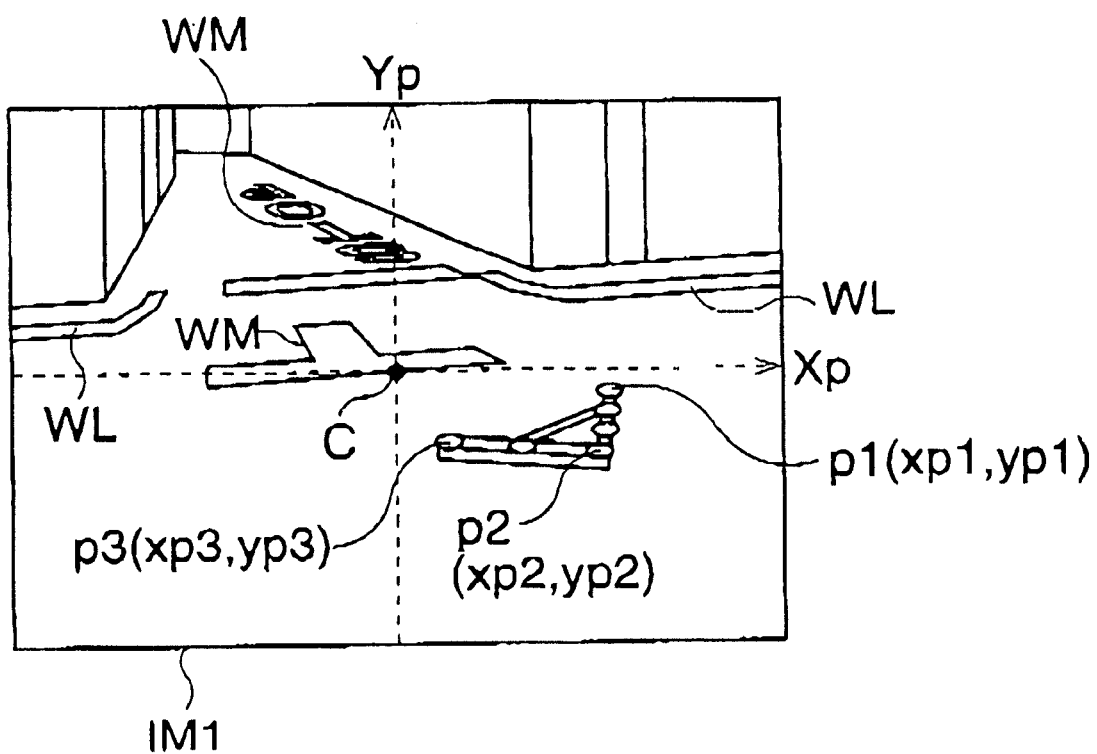
FIG. 6 is an actual view of a picture photographed at the first photographing position shown in FIG. 4.

Referring to FIGS. 4 to 6, the spatial determination of the first photographing position M1 with respect to the target TG will be representatively explained.

FIG. 4 shows a positional relationship between the camera 50 and the target TG when performing the photographing operation at the first photographing position M1. In the positional relationship of FIG. 4, of course, the target TG is within a view-angle defined by the photographing lens system of the camera 50, boundaries of the view-angle being indicated by references FF. Also, the optical axis of the photographing lens system of the camera 50 is indicated by reference O1. As stated hereinbefore, the first photographing position M1 is defined as the back principal point M of the photographing optical lens system of the camera 50.

As is apparent from FIG. 4, the target TG has an L-shaped configuration, and is provided with reference points 32, 34 and 36. A line segment between the reference points 32 and 34 is perpendicular to a line segment between the reference points 34 and 36, and both the line segments have a same length.

Referring to FIG. 5, the positional relationship of FIG. 4 is geometrically and conceptually illustrated. In this drawings, reference F indicates an image plane defined by the photographing optical lens system of the camera 50, and the picture formed on the image plane F is indicated by reference IM1. The picture IM1, of course, corresponds to the first picture photographed at the position M1 (FIG. 1), and is actually shown in FIG. 6.

As shown in FIG. 5, the optical axis O1 passes through a center C of the image plane F or picture IM1, and a distance between the center C and the back principal point M (M1) is defined as a focal distance f. A three-dimensional $X_S$-$Y_S$-$Z_S$ coordinate system is defined on the target TG located at the first target position RP1, as shown in FIG. 5. Namely, the origin of the $X_S$-$Y_S$-$Z_S$ coordinate system is at the reference point 34 of the target TG, the $X_S$-axis coincides with the line segment between the reference points 32 and 34, and the $Z_S$-axis coincides with the line segment between the reference points 34 and 36. Of course, the $Y_S$-axis is perpendicular to both the $X_S$- and $Z_S$-axes. Note, the $X_S$-$Y_S$-$Z_S$ coordinate system, defined on the target TG located at the first target positions RP1, is referred to as a first scene coordinate system hereinafter.

The survey map is produced by projecting thee-dimensional coordinates representing an image point on a plane defined by the $X_S$- and $Z_S$-axes of the first scene coordinate system ($X_{S1}$ -$_{YS}$-$Z_S$), and the plane concerned must be horizontal before the production of the survey map can be properly performed. Nevertheless, the target TG cannot necessarily be horizontally positioned on the roadway when being located at the first target positions RP1. Thus, if the target TG is tilted with respect to a horizontal plane, the plane concerned is also tilted. The tilt of the target TG is corrected on the basis of the tilt-angle data, which is derived from the tilt-angle signal transmitted from the radio transmitter of the target TG. Accordingly, although the target TG is tilted, it is possible to properly perform the definition of the fist scene coordinate system ($X_S$-$Y_S$-$Z_S$).

In FIG. 5, a distance between the reference points 32 and 34 is represented by reference LT, and thus a distance between the reference points 34 and 36 can be represented by the same reference LT, because the respective line segments between the reference points 32 and 34 and between the reference points 34 and 36 have the same length, as mentioned above. Accordingly, as shown in FIG. 5, the reference point 32 is represented by the coordinates $P_{S1}$(-LT, 0, 0), the reference point 34 is represented by the origin coordinates $P_{S2}$ (0, 0, 0), and the reference point 36 is represented by the coordinates $P_{S3}$ (0, 0, LT).

The back principal point M (M1) is determined with respect to the first scene coordinate system ($X_S$-$Y_S$-$Z_S$). To this end, a two-dimensional $X_P$-$Y_P$ coordinate system is defined on the image plane F or first picture IM1, as shown in FIGS. 5 and 6, and a three-dimensional $X_C$-$Y_C$-$Z_C$ coordinate system or camera coordinate system is defined on the camera 50, as shown in FIG. 5.

As best shown in FIG. 6, the origin of the $X_P$-$Y_P$ coordinate system coincides with the center C of the image plane F or first picture IM1, and the $X_P$- and $Y_P$-axes extend horizontally and vertically, respectively. The reference points 32, 34 and 36 photographed on the first picture IM1 are represented by two-dimensional coordinates $p_1$ ($xp_1$, $yp_1$), $p_2$ ($xp_2$, $yp_2$) and $p_3$ ($xp_3$, $yp_3$), respectively. Note, the $X_P$-$Y_P$ coordinate system is referred to as a picture-coordinate system hereinafter.

Also, as shown in FIG. 5, the origin of the $X_C$-$Y_C$-$Z_C$ coordinate system coincides with the back principal point M (M1), the $Z_C$-axis coincides with the optical axis O1, and the respective $X_C$- and $Y_C$-axes are in parallel to the $X_P$- and $Y_P$-axes of the two-dimensional coordinate system $X_P$-$Y_P$. The origin of the $X_C$-$Y_C$-$Z_C$ coordinate system or back principal point M is represented by three-dimensional coordinates M($\Delta X$, $\Delta Y$, $\Delta Z$) which are based on the first scene coordinate system ($X_S$-$Y_S$-$Z_S$). An orientation of the $Z_C$-axis or optical axis O1 is represented by three-dimensional angular coordinates ($\alpha$, $\beta$, $\gamma$) which are defined with respect to the first scene coordinate system ($X_S$-$Y_S$-$Z_S$). Namely, the $Z_C$-axis or optical axis O1 defines angles of $\alpha$, $\beta$ and $\gamma$ with the $X_S$-, $Y_S$- and $Z_S$-axes of the first scene coordinate system, respectively.

When two-dimensional coordinates $p_i$ ($xp_i$, $yp_i$) (i=1, 2, 3), representing the coordinates $p_1$ ($xp_1$, $yp_1$), $p_2$ ($xp_2$, $yp_2$) and $p_3$ ($xp_3$, $yp_3$) based on the picture-coordinate system ($X_P$-$Y_P$) are expressed by three-dimensional coordinates $P_{ci}$ ($P_{cxi}$, $P_{cyi}$, $P_{czi}$) based on the camera coordinate system ($X_C$-$Y_C$-$Z_C$), the X-coordinate $xp_i$ and the Y-coordinate $yp_i$ are represented by the following formulas (1) and (2), respectively.

$$xp_i = f(P_{cxi}/P_{czi}) \quad (1)$$

$$yp_i = f(P_{cyi}/P_{czi}) \quad (2)$$

Herein: "i"=1, 2 or 3, and "f" is the focal distance.

On the other hand, the three-dimensional coordinates $P_{ci}$ ($P_{cxi}$, $P_{cyi}$, $P_{czi}$) based on the camera coordinate system ($X_C$-$Y_C$-$Z_C$) is expressed by three-dimensional coordinates $P_{si}$ ($P_{sxi}$, $P_{syi}$, $P_{szi}$) based on the scene coordinate system ($X_S$-$Y_S$-$Z_S$) as follows:

$$P_{ci} = R(P_{si} - \Delta) \quad (3)$$

$$R = \begin{pmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\sin\gamma & \cos\alpha\cos\gamma - \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{pmatrix}$$

$$\Delta = \begin{pmatrix} \Delta X \\ \Delta Y \\ \Delta Z \end{pmatrix}$$

Herein: "R" is a rotational matrix of the angles $\alpha$, $\beta$, $\gamma$, and "$\Delta$" is a vector representing a movement distance of the origin of the camera coordinate system ($X_C$-$Y_C$-$Z_C$) from the origin of the scene coordinate system ($X_S$-$Y_S$-$Z_S$).

In short, the three-dimensional coordinates M($\Delta X$, $\Delta Y$, $\Delta Z$) and the three-dimensional angular coordinates ($\alpha$, $\beta$, $\gamma$) are calculated by the formula (1), (2) and (3), whereby the back principal point M or first photographing position M1 is spatially determined with respect to the scene coordinate system ($X_S$-$Y_S$-$Z_S$).

In reality, each of the reference points 32, 34 and 36 is represented as a small white circle, which is formed at a center of a circular black plate element attached to an L-shaped member. By suitably processing a frame of image data read from the memory card 13, the small white circles, representing the reference points 32, 34 and 36, are extracted from the frame of image data by the CPU 14, and then the two-dimensional coordinates of each reference point (32, 34, 36) are determined with respect to the picture-coordinate system ($X_P$-$Y_P$), resulting in the definition of the scene coordinate system ($X_S$-$Y_S$-$Z_S$).

The remaining photographing positions M2 to M18 are spatially determined in substantially the same manner as mentioned above. Of course, the spatial determination of the photographing positions M2 and M6 are executed with respect the first scene coordinate system ($X_S$-$Y_S$-$Z_S$) defined on the target TG located at the first target position RP1, the spatial determination of the photographing positions M7 to M10 are performed with respect to a second scene coordinate system defined on the target TG located at the second target position RP2, and the spatial determination of the photographing positions M11 to M18 are executed with respect to a third scene coordinate system defined on the target TG located at the third target position RP3.

Note, the above-mentioned spatial determination of the photographing positions M1 to M18 is automatically executed when the eighteen frames of image data are read from the memory-card 13.

When the survey map of the roadway is produced by successively connecting the nine survey map sections to each other, the spatial determination of all the eighteen photographing positions M1 and M18 must be united with respect to any one of the first, second and third scene coordinate systems. For example, when the first scene coordinate system ($X_S$-$Y_S$-$Z_S$) is selected for the determination of all the photographing positions M1 to M18, the second and third scene coordinate systems must be transformed into the first coordinate system ($X_S$-$Y_S$-$Z_S$).

Figure 7:
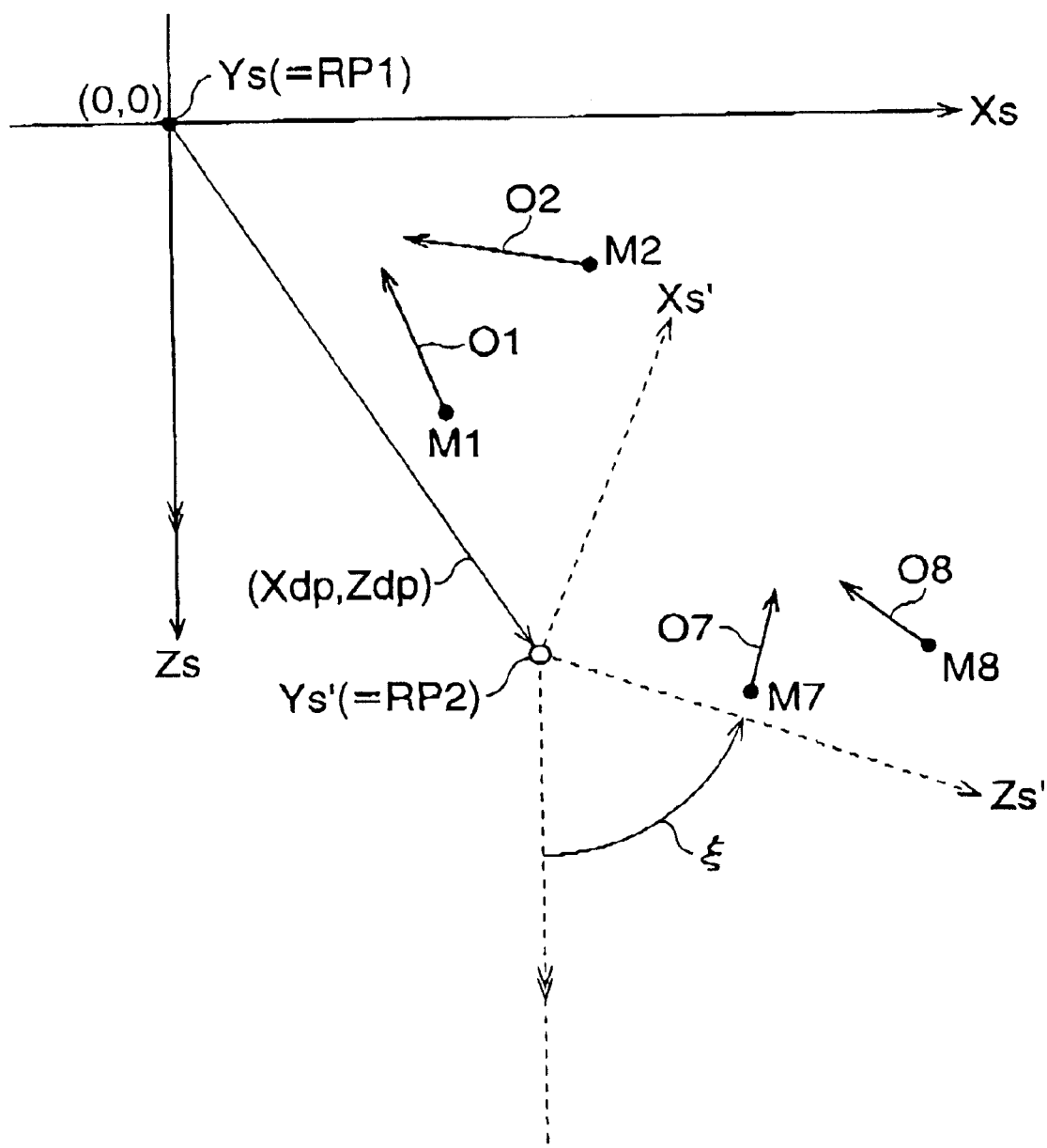
FIG. 7 is a geometrical and conceptual illustration showing a transformation of a second scene coordinate system, defined on the target moved from the position shown in FIG. 4.

Referring to FIG. 7, the transformation of the second scene coordinate system into the first scene coordinate system ($X_S$-$Y_S$-$Z_S$) is conceptually shown. In this drawing, the three axes of the second scene coordinate system are indicated by references $X_S'$, $Y_S'$ and $Z_S'$, and the movement of the target TG from the first target position RP1 to the second target position RP2 is represented by two-dimensional coordinates ($X_{dp}$, $Z_{dp}$) based on the first scene coordinate system ($X_S$-$Y_S$-$Z_S$). Also, an angle of $\xi$ indicates a relative rotational angle of the target TG between the first and second target positions RP1 and RP2. In FIG. 7, each of references O2, O7 and O8 indicates an orientation of the optical axis of the camera 50 located at the corresponding photographing position (M2, M7, M8).

The two-dimensional coordinates ($X_{dp}$, $Z_{dp}$) and the rotational angle $\xi$ are determined by calculating the three-dimensional coordinates of the connection points RC1 and RC2 of the cone-shaped markers MK1 and MK2 with respect to the first and second scene coordinate systems ($X_S$-$Y_S$-$Z_S$, $X_S'$-$Y_S'$-$Z_S'$), respectively.

After the determination of the two-dimensional coordinates ($X_{dp}$, $Z_{dp}$) and the rotational angle of $\xi$, the transformation of the second scene coordinate system ($X_S'$-$Y_S'$-$Z_S'$) into the first scene coordinate system ($X_S$-$Y_S$-$Z_S$) is performed on the basis of the following formula (4):

$$\begin{pmatrix} X_S \\ Z_S \end{pmatrix} = \begin{pmatrix} \cos\xi & -\sin\xi \\ \sin\xi & \cos\xi \end{pmatrix} \begin{pmatrix} X_S' \\ Z_S' \end{pmatrix} + \begin{pmatrix} X_{dp} \\ Z_{dp} \end{pmatrix} \quad (4)$$

Of course, the transformation of the third scene coordinate system into the first scene coordinate system ($X_S$-$Y_S$-$Z_S$) is performed in substantially the same manner as mentioned above.

Figure 8:
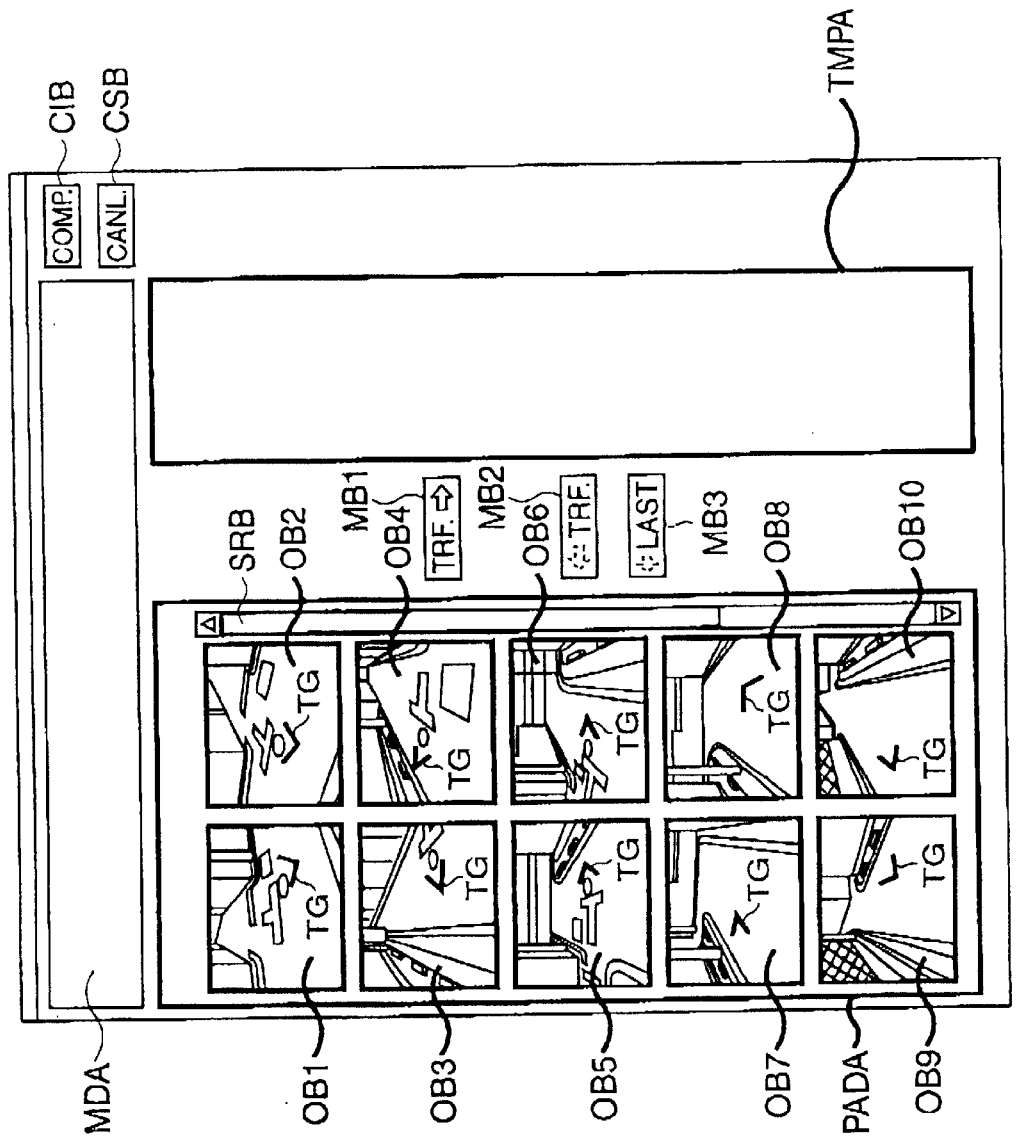
FIG. 8 is a view showing a picture-arrangement-mode scene of a monitor included in the photogrammetric image processing computer system according to the present invention.

With reference to FIG. 8, by way of example, a picture-arrangement-mode scene, displayed on the monitor 10, is shown for arranging the nine pairs of pictures produced based on the nine frames of image data read from the memory card 13 in the photographing order. Note, the picture-arranging-mode scene is selected from an initial menu scene (not shown) displayed on the monitor 10 after the image processing computer system is powered ON. As shown in FIG. 8, the picture-arranging-mode scene includes a picture-arranging-display area PADA, a picture-shunting-display area TMPA, and a message-display area MDA.

The picture-arranging-display area PADA is provided for displaying the eighteen pictures obtained at the photographing positions M1 to M18, respectively. The display of each picture on the display area PADA is performed at a reduced size, and the reduced sized picture is referred to as an object, hereinafter. In FIG. 8, the ten objects, indicated by references OB1 to OB10, correspond to the pictures obtained at the photographing positions M1 to M10, respectively. Although the remaining eight objects, corresponding to the pictures obtained at the photographing positions M11 to M18, respectively, are not displayed on the display area PADA, the display of the remaining objects is possible by operating a scroll bar SRB with the mouse. Note, of course, the remaining eight objects are to be indicated by references OB11 to OB18, respectively. Image data for the objects OB1 to OB18 are produced based on the eighteen frames of image data read from the memory card 13, and are stored in the display memory 20.

As is apparent from FIG. 8, the nine pairs of objects (OB1 and OB2; OB3 and OB4; OB5 and OB6; OB7 and OB8; OB9 and OB10; OB11 and OB12; OB13 and OB14; OB15 and OB16; and OB17 and OB18) are arranged on the display area PADA in the photographing order so as to form a pair of columns, and the arrangement of the nine pairs of objects is automatically performed when the picture-arranging-mode scene is selected from the initial menu scene displayed on the monitor 10.

As stated with reference to FIG. 1, when the eighteen photographing operations (M1 to M18) are consecutively and continuously performed without an additional photographing operation intervening, two pictures or objects in each pair for producing a survey map section are properly and orderly arranged side by side on the display area PADA, as shown in FIG. 8. Of course, in this case, it is unnecessary to rearrange the nine pairs of objects on the display area PADA.

Nevertheless, if an additional photographing operation is performed between, for example, the second and third photographing operations M2 and M3, an object, corresponding a picture obtained by the additional photographing operation, intervenes between the second and third objects. In this case, the nineteen frames of image data are stored in the memory card 13, and the nineteen objects are displayed and arranged on the display area PADA, as shown FIG. 9 in which the additional object is indicated by reference OBX. As is apparent from this drawing, although the two objects OB1 and OB2 included in the first pair are properly arranged side by side, two objects included in each remaining pair are not properly arranged due to the intervention of the additional object OBX between the second and third objects OB2 and OB3.

Note, the additional photographing operation may be performed to photograph and record, for example, evidence or circumstances concerning an traffic accident, regardless of the photogrammatic analytical measurement.

An existence of the additional object OBX can be easily and visually recognized by an operator, because there is no close relationship between the additional object OBX and the object OB3. In other words, there is a visually-close relationship between two pictures included in a pair for producing a survey map section, because each of the survey map sections is produced based on a pair of common partial areas photographed and recorded on the pictures in a corresponding pair. Thus, it is possible for an operator to easily and visually select the additional object OBX from among the nineteen objects.

Figure 9:
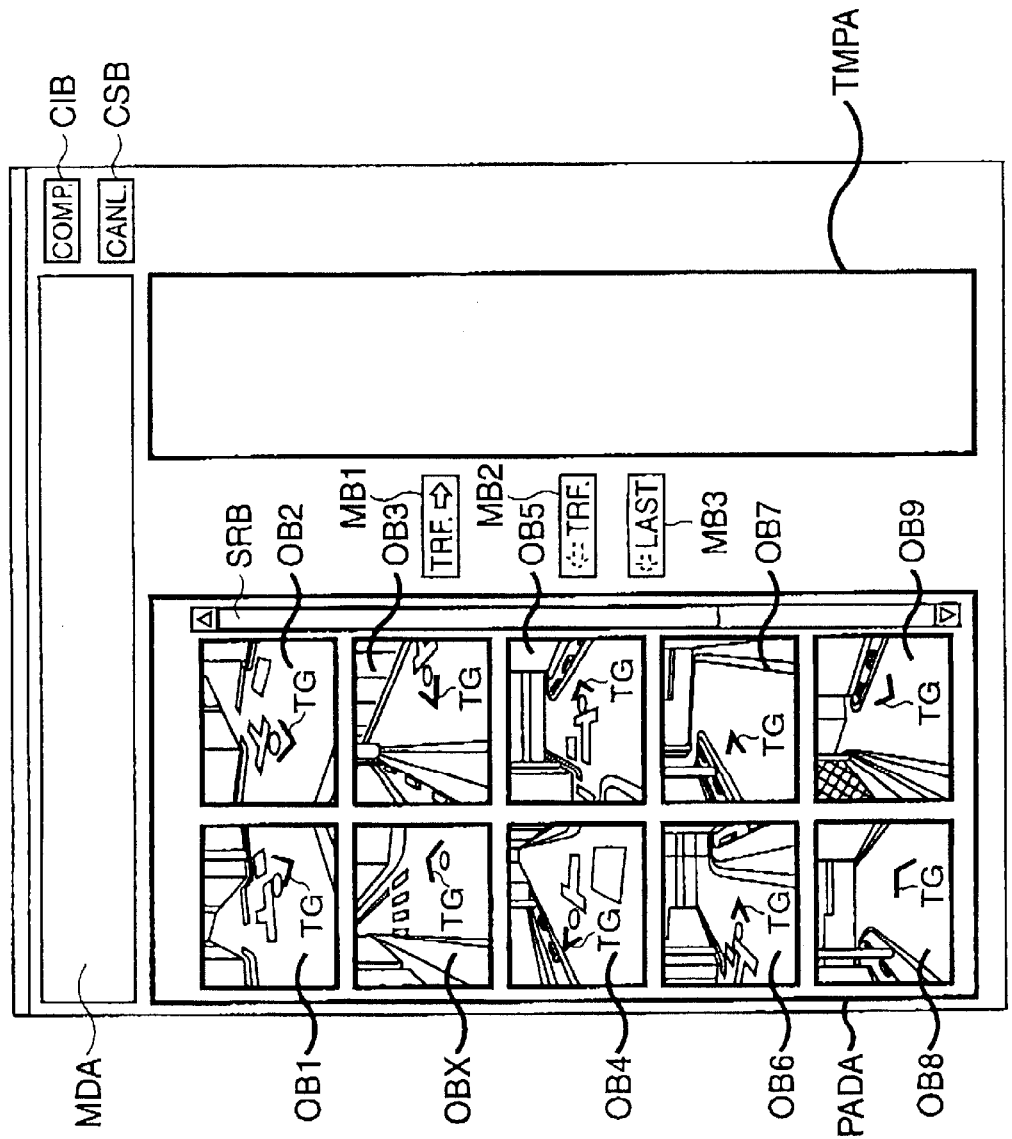
FIG. 9 is a view, similar to FIG. 8, showing the picture-arrangement-mode scene at an aspect different from FIG. 8.
Figure 10:
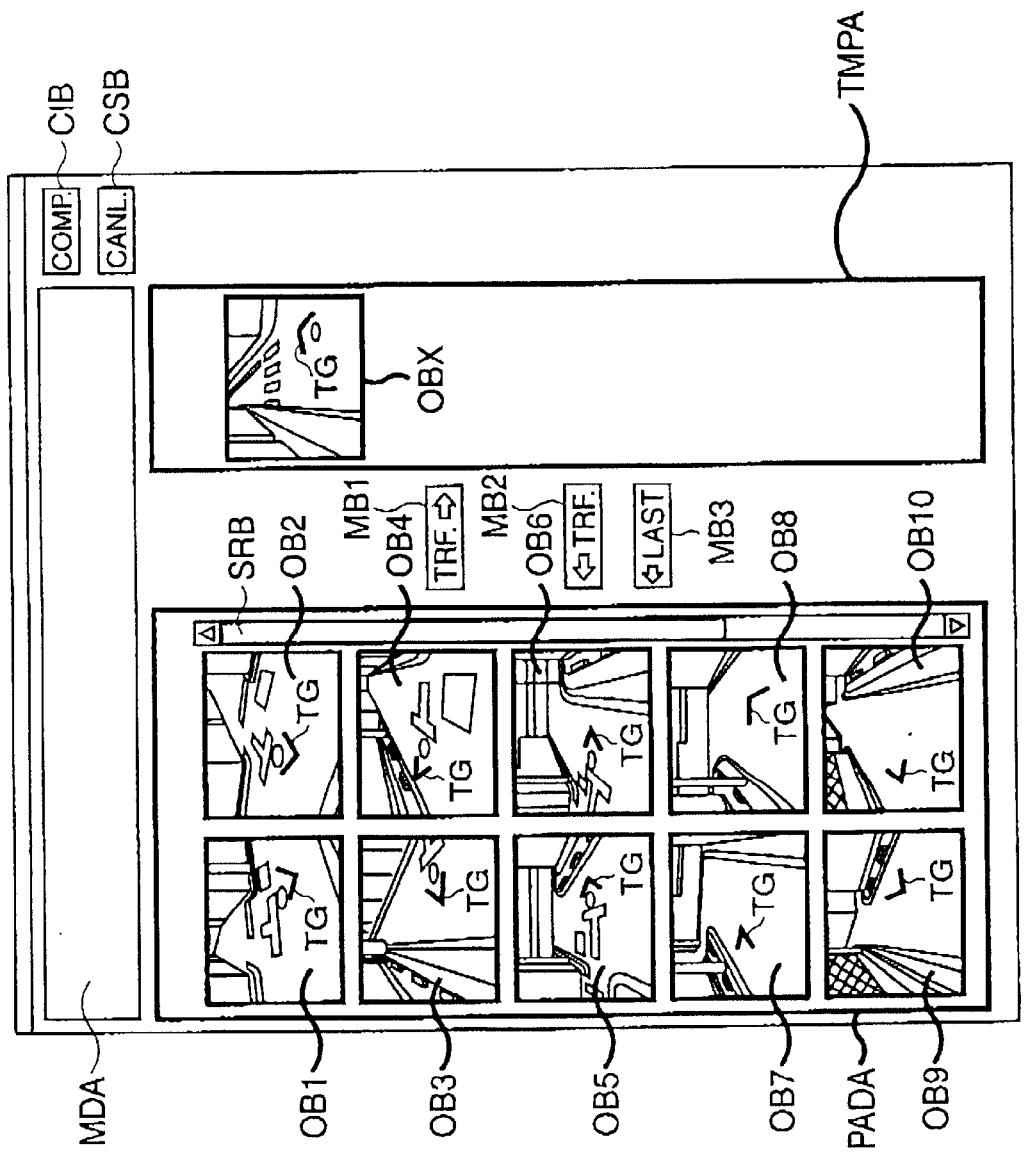
FIG. 10 is a view, similar to FIG. 8, showing the picture-arrangement-mode scene at another aspect different from FIG. 8.

In the case as shown in FIG. 9, the objects OB1 to OB18 must be rearranged such that the proper arrangement of the objects OB1 to OB18 can be obtained as shown in FIG. 8, and the rearrangement of the objects OB1 to OB18 is performed by temporarily transferring the additional object OBX from the picture-arranging-display area PADA to the picture-shunting-display area TMPA, as shown in FIG. 10.

For the rearrangement of the objects OB1 to OB18, three object-transferring buttons MB1, MB2 and MB3 are displayed on the picture-arranging mode scene (FIGS. 8, 9 and 10) between the display areas PADA and TMPA. The first object-transferring button MB1 is provided for transferring an object from the picture-arranging-display area PADA to the picture-shunting-display area TMPA, and the second and third object-transferring buttons MB2 and MB3 are provided for returning an object from the picture-shunting-display area TMPA to the picture-arranging-display area PADA.

In particular, for example, before the additional object OBX can be transferred from the display area PADA to the display area TMPA, first, the additional object OBX must be indicated by clicking on it with the mouse, to reverse the additional object OBX to a negative object image, whereby the additional object OBX can be visually distinguished from the remaining objects. Then, when the first object-transferring button MB1 is operated by clicking on it with the mouse, the transfer of the additional object OBX from the display area PADA to the display area TMPA is completed, whereby the objects OB1 to OB18 can be properly rearranged on the picture-arranging-display area PADA, as shown in FIG. 10, similar to the case shown in FIG. 8.

Also, there may be a case where three photographing operations are carefully performed to produce a survey map section for which a pair of pictures should be selected from the three pictures derived from the three photographing operations. In this case, the first object-transferring button MB1 can be used to eliminate one of the three pictures or objects derived from the three photographing operations, whereby a proper rearrangement of the objects can be obtained on the picture-arranging-display area PADA.

When an object is erroneously transferred from the display area PADA to the display area TMPA, it is possible to return the object concerned from the display area TMPA to the display area PADA, using the second object-transferring button MB2. In particular, first, an object displayed on the area TMPA is indicated by clicking on it with the mouse, and then an object, displayed on the area PADA at a location at which the object concerned is to be returned, is indicated by clicking on it with the mouse. After the indication of both the objects, when the second object-transferring button MB2 is operated by clicking on it with the mouse, the return of the object concerned from the area TMPA to the area PADA is performed such that the object concerned is displayed so as to be wedged in the location at which the indicated object is displayed on the area PADA, with the indicated object and the following objects being moved down on the area PADA.

For example, when the additional object OBX shown in FIG. 9 is returned to the original location on the display area PADA, the additional object OBX and the object OB3 are indicated by clicking on them with the mouse, and the return of the additional object OBX to the original location on the area PADA is performed by operating the button MB2 by clicking on it with the mouse, whereby the arrangement of the objects on the area PADA is again returned as shown in FIG. 9.

Although it is preferable to orderly perform a series of photographing operations for the photogrammetric analytical measurement, as stated with reference to FIG. 1, in reality, the photographing operations may be disorderedly performed for various reasons. In this case, it is necessary to thoroughly rearrange objects disorderedly displayed on the picture-arranging-display area PADA, before a proper arrangement of the objects can be obtained. It is possible to advantageously utilize the third object-transferring button MB3 for the thorough rearrangement of the objects. In particular, after an object, displayed on the display area TMPA, is indicated by clicking on it with mouse, when the button MB3 is operated by clicking on it with the mouse, the indicated object is returned to the display area PADA, and is then displayed at an end location of either column of the objects displayed on the display area PADA.

Thus, when some objects are rearranged on the display area PADA, objects having no relation to the rearrangement of the objects concerned can be successively moved to the end locations of the columns of the objects displayed on the display area PADA, thereby facilitating the rearrangement of the objects concerned.

Note, whenever an object displayed on either the picture-arranging-displayed area PADA or the picture-shunting-display area TMPA is indicated by clicking on it with the mouse, the indicated object is reversed to a negative image object.

The message-displayed area MDA is utilized to display various messages for properly guiding the operator while various processing are executed under command of the operator for the rearrangement of the objects.

As shown in FIGS. 8, 9 and 10, a completion button CIB and a cancel button CSB are displayed adjacent to the message-display area MDA on the picture-arranging-mode scene of the monitor 10.

After the proper arrangement of the objects is obtained on the display area PADA, as shown in FIG. 8 or 10, when the completion button CIB is operated by clicking on it with the mouse, two pictures, corresponding to two objects arranged side by side on the display area PADA, are fixed as forming a pair for producing a survey map section, and the nine pairs of pictures (OB1 and OB2; OB3 and OB4; OB5 and OB6; OB7 and OB8; OB9 and OB10; OB11 and OB12; OB13 and OB14; OB15 and OB16; and OB17 and OB18) are stored in the working memory is or in a suitable memory medium (not shown), such as a hard disc, provided in the image processing computer system. Then, the picture-arranging-mode scene of the monitor 10 is returned to the initial menu access.

When an object is erroneously indicated on either display area PADA or TMDA by clicking on it with the mouse, it is possible to cancel the erroneous indication of the object by operating the cancel between can by clicking on it with the mouse.

After the respective plural pairs of picture for producing the survey map sections are fixed as mentioned above, it is necessary to determine connection-relationships between the plural pairs of pictures, before a connection-processing for successively connecting the survey map sections to each other can be effectively performed, resulting in a facilitation of the production of the survey map.

Figure 11:
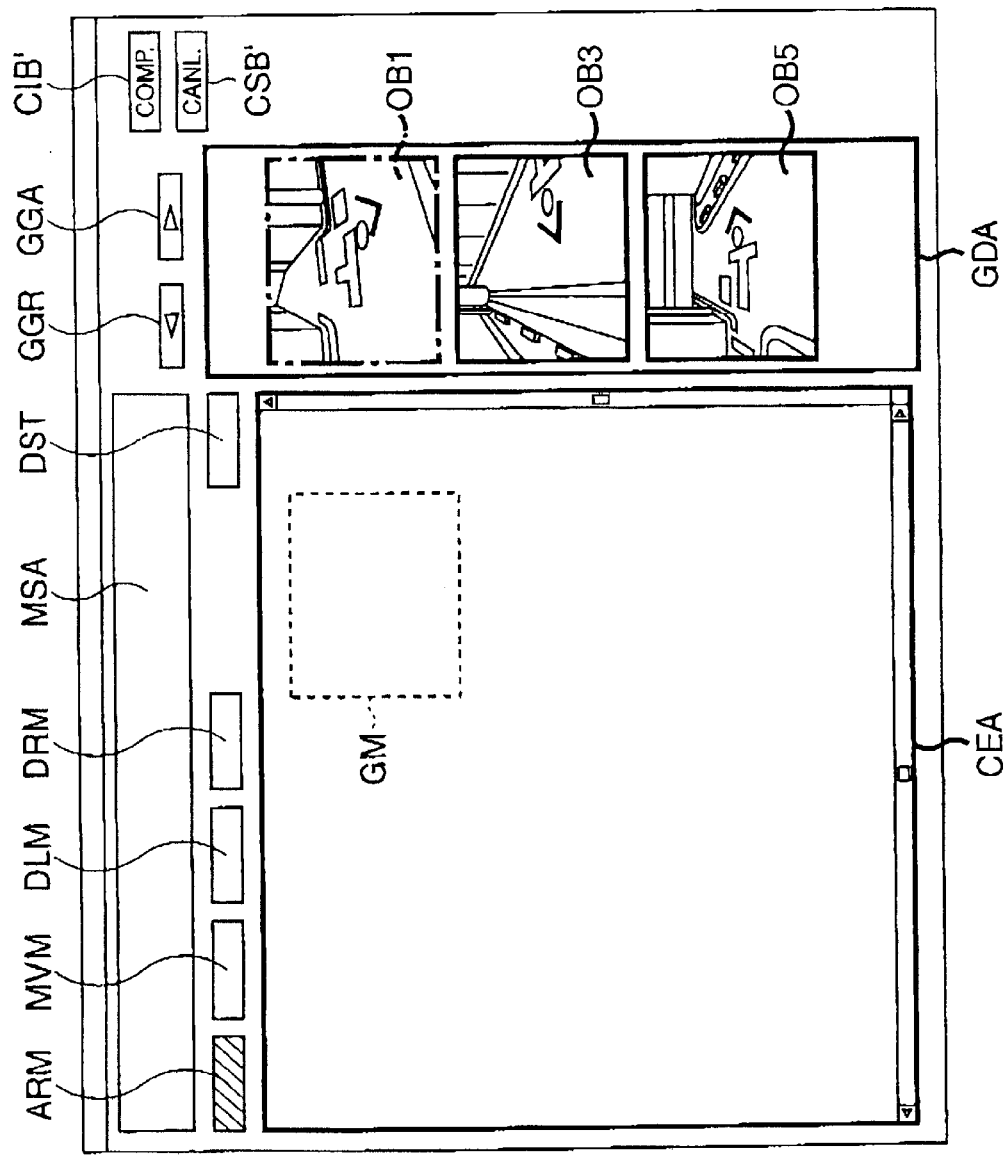
FIG. 11 is a view showing a connection-mode scene of the monitor.

FIG. 11 shows, by way of example, a picture-connecting-mode scene of the monitor 10 on which the connection-processing for the successive connection of the nine pairs of pictures to each other is executed. Similar to the picture-arranging-mode scene, the picture-connecting-mode scene is selected from the initial menu scene displayed on the monitor 10. As shown in FIG. 11, the picture-connecting-mode scene includes a picture-display area GDA and an editing-display area CEA.

As shown in FIG. 11, a part of the pictures or objects OB1, OB2, OB3, OB4, OB5 and OB6 included in the first group are initially display on the picture-display area GDA. As mentioned above, the first group of pictures, featuring the target TG located at the first target position RP1, is composed of the first pair of pictures (OB1, OB2), the second pair of pictures (OB3, OB4) and the third pair of pictures (OB5, OB6), and only one picture (OB1, OB3, OB5) in each pair is representatively display on the picture-display area GDA.

As shown in FIG. 11, an advancing button GGA and a returning button GGR are displayed adjacent to the top of the picture-display area GDA. When the advancing button GGA is operated by clicking on it with the mouse, the scene of the picture-display area GDA is changed such that a part (OB7 and OB9) of the pictures or objects OB7, OB8, OB9 and OB10 included in the second group are displayed thereon in substantially the same manner as that part (OB1, OB3 and OB5) of the pictures included in the first group. When the advancing button GGA is further operated by clicking on it with the mouse, a part (OB11, OB13, OB15 and OB17) of the pictures or objects OB11, OB12, OB13, OB14, OB15, OB16, OB17 and OB18 included in the third group are displayed on the picture-display area GDA in substantially the same manner as the part of the pictures included in the first group. On the other hand, whenever the returning button GGR is operated by clicking on it with the mouse, the scenes of the picture-display area GDA are successively returned. In short, by suitably operating the buttons GGA and GGR, it is possible to selectively display any one of the above-mentioned three parts of the pictures on the picture-display area GDA.

The editing-display area CEA is used as a visual editing area for connection-editing the pictures or objects. As shown in FIG. 11, mode-setting buttons ARM, MVM and DLM are displayed adjacent to the top of the editing-display area CEA.

The mode setting button ARM serves as an object-transferring/connecting-mode button. When the button ARM is operated by clicking on it with the mouse, an object-transferring/connecting mode is set. In reality, the operated button ARM is displayed as if being depressed, whereby it is possible to visually confirm the setting of the object-transferring/connecting mode. In this mode, the pictures or objects are transferred from the picture-display area GDA to the editing-display area CEA, and are visually connected to each other. Note, whenever the picture-connecting-mode scene (FIG. 11) is selected from the initial menu scene of the monitor 10, the object-transferring/connecting mode is forcibly set.

The mode setting button MVM serves as an object-arranging-mode button. When the button MVM is operated by clicking on it with the mouse, an object-arranging mode is set. The operated button MVM is also displayed as if being depressed, whereby the setting of the object-arranging mode can be visually confirmed. In this mode, the pictures or objects can be optionally arranged on the editing-display area CEA.

The mode setting button DLM serves as an object-deleting-mode button. When the button DLM is operated by clicking on it with the mouse, an object-deleting mode is set. Similarly, the operated button DLM is displayed as if being depressed, whereby the setting of the object-deleting mode can be visually confirmed. In this mode, the pictures or objects can be deleted from the editing-display area CEA, and the deleted objects can be again displayed on the picture-display area GDA.

Note, in FIG. 11, the operated button ARM is hatched to as to be distinguished from the non-operated buttons MVM and DLM.

In the object-transferring/connecting mode (ARM), for example, when the object OB1 is indicated by clicking on it with the mouse, the object OB1 is encompassed by a single-dot-line frame, as shown in FIG. 11, whereby the object OB1 is visually distinguished from the remaining objects OB3 and OB5. Then, when the pointer (not shown) is moved in the editing-display area CEA by manipulating the mouse, a broken-line frame GM is displayed on the editing-display area CEA such that the pointer is surrounded by the broken-line frame GM. When the pointer is moved within the editing-display area CEA by manipulating the mouse, the pointer takes with it the broken-line frame GM. Thus, the broken-line frame GM can be positioned at a given location by the pointer. After the positioning of the broken-line frame GM, when a clicking operation is performed with the mouse, all the objects OB1, OB3 and OB5 are once transferred from the picture-display area GDA to the editing-display area CEA, as shown in FIG. 12.

The transferred objects OB1, OB3 and OB5 are connected to each other in the rearrangement-order, as explained by reference to FIGS. 9 and 10, by connecting-strips CNS displayed on the editing-display area CEA, whereby it is possible to visually recognize the connection-relationship between the objects OB1, OB3 and OB5. Each of the displayed connecting-strips CNS behaves just like a rubber strip connected between the centers of the two adjacent objects (OB1 and OB3 and OB3 and OB5) at the back faces thereof. Namely, for example, if the object OB1 is moved apart from the remaining objects OB3 and OB5 in the object-arranging mode, the connecting-strip CNS is displayed as being extended between the centers of the objects OB1 and OB3.

Figure 12:
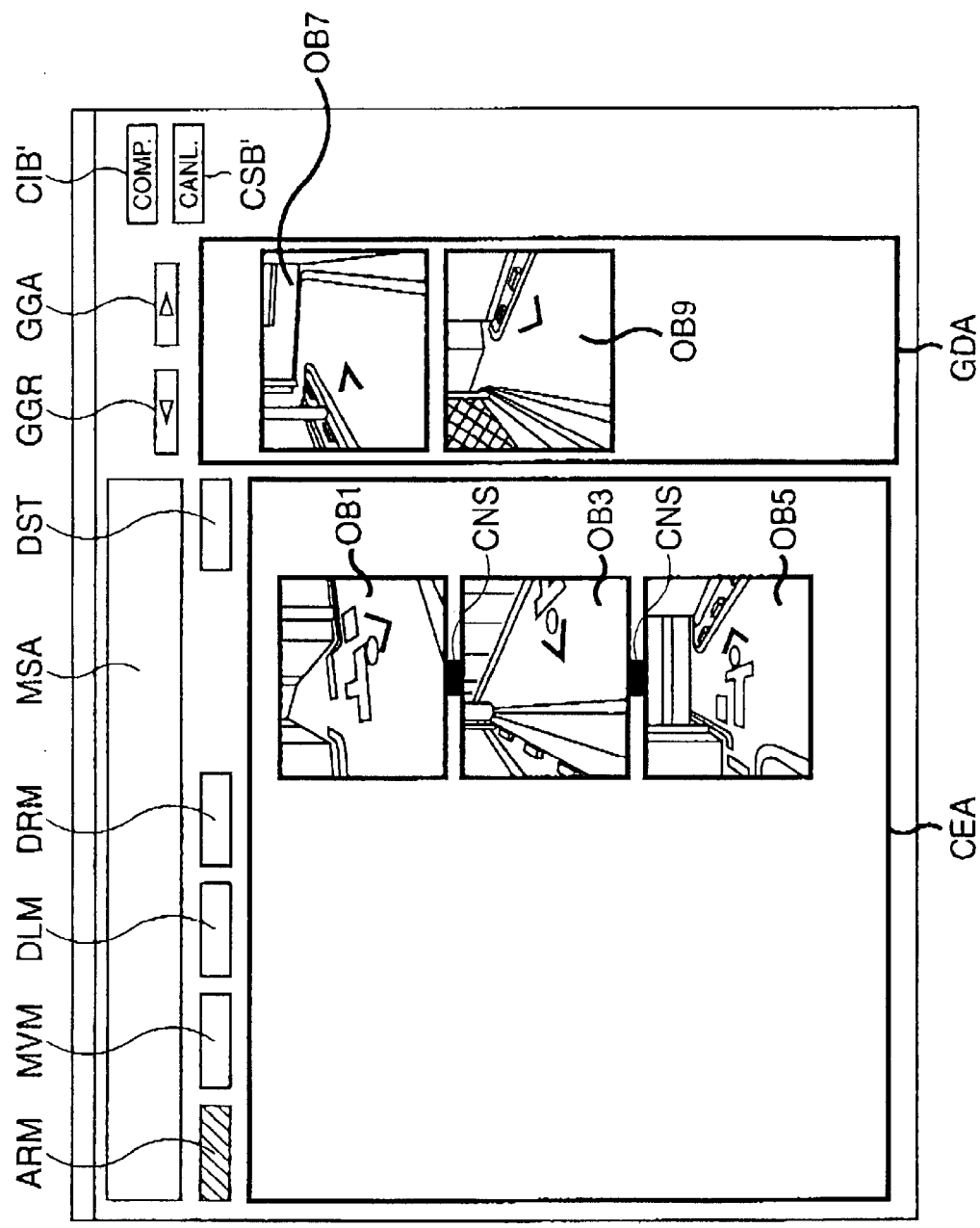
FIG. 12 is a view, similar to FIG. 11, showing the connection-mode scene at an aspect different from FIG. 11.

In the scene of FIG. 12, as mentioned above, when the object-deleting button DLM is operated by clicking on it with the mouse, the object-deleting mode is selected. In this mode, when one of the objects OB1, OB3 and OB5 is indicated by clicking on it wit the mouse, all the objects OB1, OB3 and OB5 are deleted from the editing-display area CEA. Then, the deleted objects OB1, OB3 and OB5 are returned to the picture-display area GDA, and are displayed without the connecting-strip CNS thereon. Namely, the scene of FIG. 12 is returned to the scene as shown in FIG. 11.

As shown in FIG. 12, as soon as the transfer of the objects OB1, OB3 and OB5 from the picture-display area GDA to the editing-display area CEA is performed, the part (OB7 and OB9) of the objects OB7, OB8, OB9 and OB10 included in the second group is displayed on the picture-display area GDA, regardless of the operation of the advancing button GGA. Namely, the objects OB7 and OB8, which correspond to the pictures obtained at the photographing positions M7 and M9, respectively, are displayed on the picture-display area GDA.

The objects OB7 and OB9 are based on the target TG being located at the second target position RP2. Thus, before the objects OB7 and OB9 can be connected to the objects OB1, OB3, OB5 based on the target TG being located at the first target position RP1, it is necessary to execute a processing for transforming the second scene coordinate system $(X_S'\text{-}Y_S'\text{-}Z_S')$ into the first scene coordinate system $(X_S\text{-}Y_S\text{-}Z_S)$.

Figure 13:
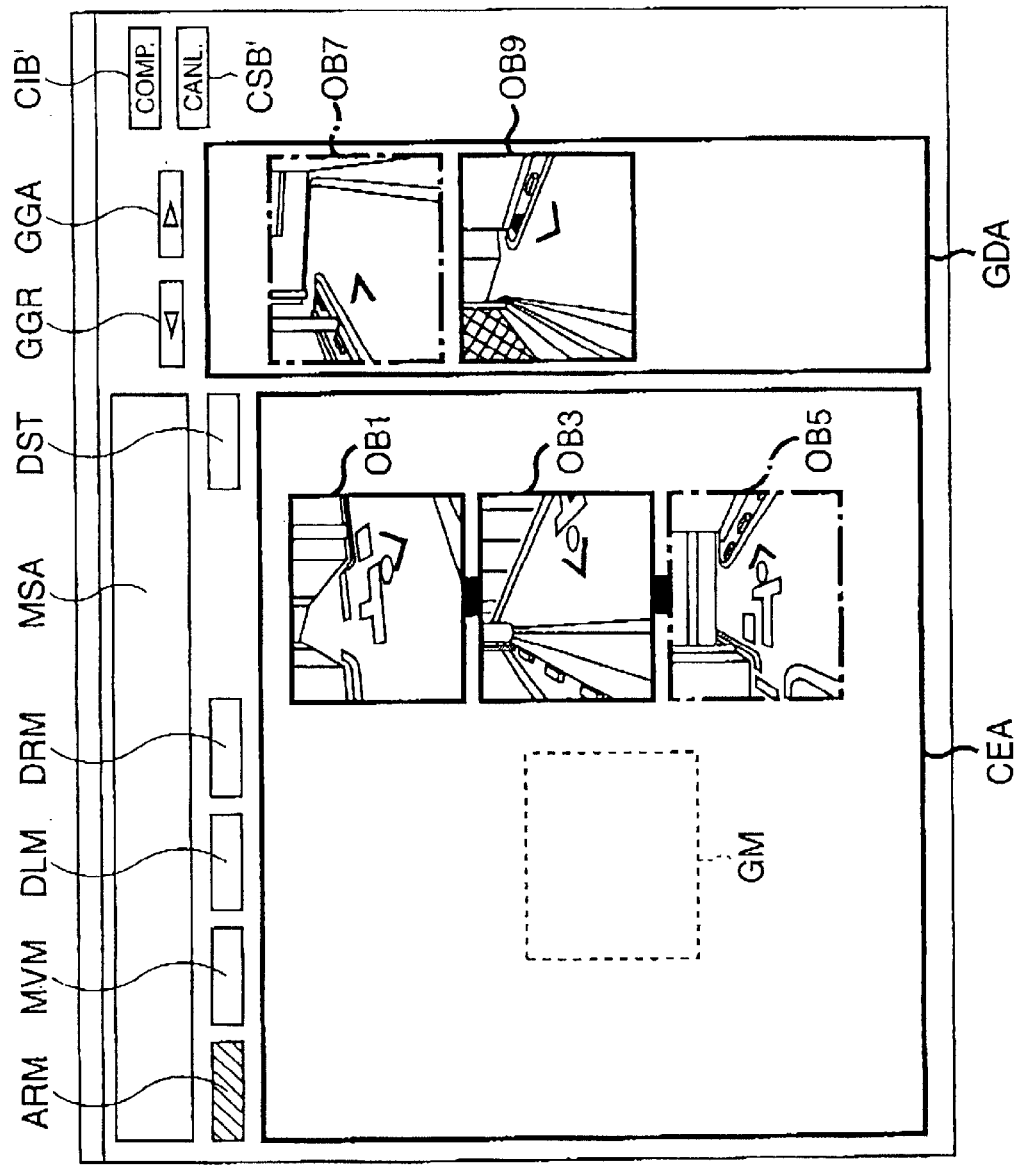
FIG. 13 is a view, similar to FIG. 11, showing the connection-mode scene at another aspect different from FIG. 11.

For the transformation of the second scene coordinate system into the first scene coordinate system, one of the objects OB7 and OB9 and one of the objects OB1, OB3 and OB5 are selected to be connected to each other. For example, as shown in FIG. 13, the objects OB7 and OB5 are selected to be connected to each other, and the selection of each object (OB7, OB5) is performed by clicking on it with the mouse, whereby each of the selected objects OB7 and OB5 are encompassed by a single-dot-line frame, as shown in FIG. 13. Then, when the pointer is moved in the editing-display area CEA by manipulating the mouse, a broken-line frame GM appears on the editing-display area CEA (FIG. 13), with the pointer indicating the center of the broken-line frame GM. After the broken-line frame GM is positioned at a given location by the pointer, when a clicking operation is performed with the mouse, the scene (FIG. 13) of the monitor 10 is changed into a scene as shown in FIG. 14.

Figure 14:
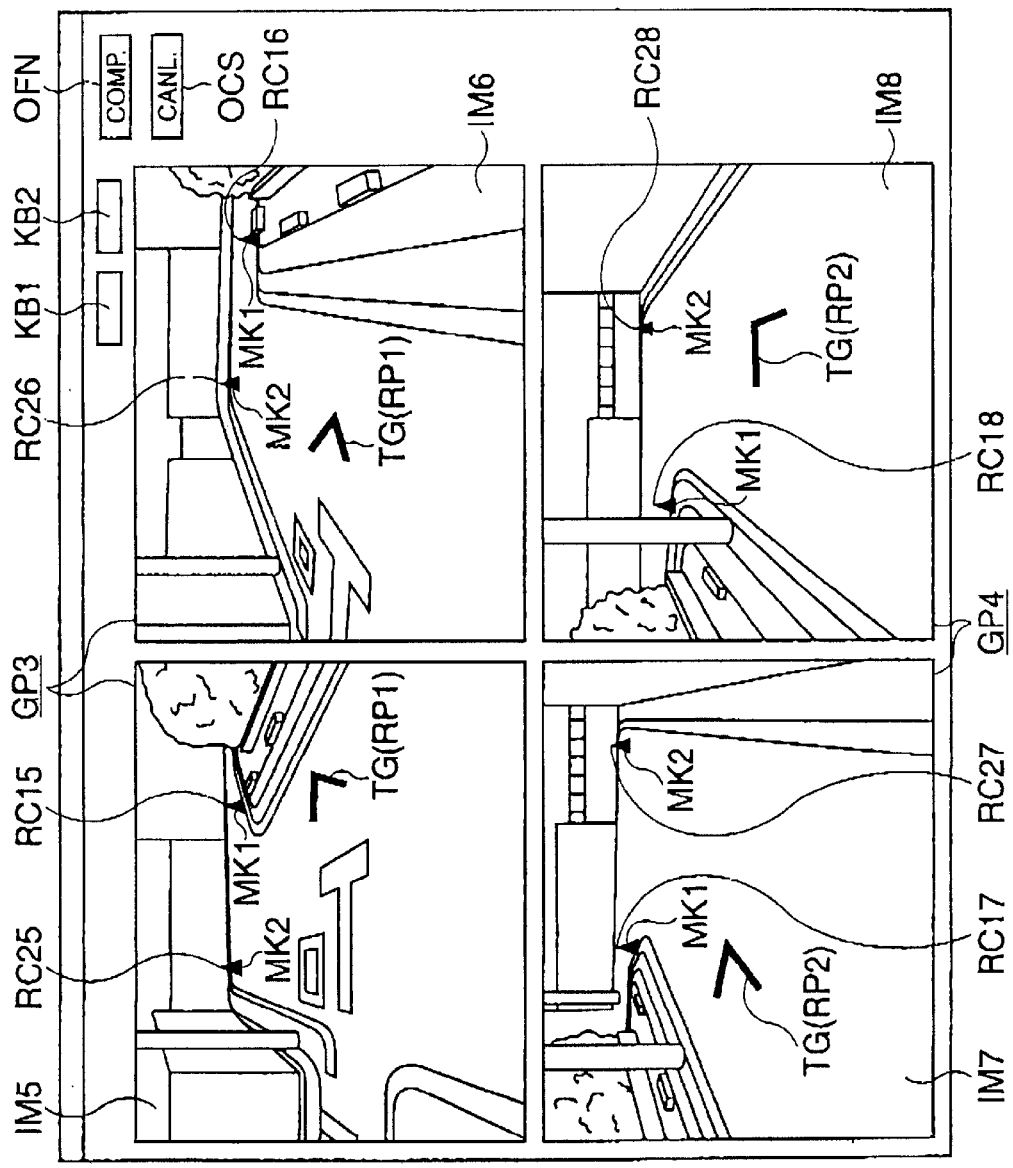
FIG. 14 is a view of a scene changed from the connection-mode scene of the monitor shown in FIG. 13.

On the scene of FIG. 14, the third pair of pictures, indicated by references IM5 and IM6, respectively, and the fourth pair of pictures, indicated by references IM7 and IM8, respectively, are displayed. Of course, the third pair of pictures IM5 and IM6, corresponding to the objects OB5 and OB6, are obtained at the photographing positions M5 and M6, and are based on the target TG being located at the first target position RP1, and the fourth pair of pictures IM7 and IM8, corresponding to OB7 and OB8, are obtained at the photographing positions M7 and M8, and are based on the target TG being located at the second target position RP2.

As shown in FIG. 14, the respective connection points RC1 and RC2 of the cone-shaped markers MK1 and MK2 (FIG. 1) are displayed as image points RC15 and RC25 on the picture IM5, and are displayed as image points RC16 and RC26 on the picture IM6. Also, the respective connection points RC1 and RC2 of the cone-shaped markers MK1 and MK2 are displayed as image pointers RC17 and RC27 on the picture IM7, and are displayed as image points RC18 and RC28 on the picture IM8.

Also, on the scene of the monitor 10 shown in FIG. 14, a first designation button KB1, a second designation button KB2, a completion button OFN and a cancel button OCS are displayed.

When the first designation button KB1 is operated by clicking on it with the mouse, a first designation mode is selected to designate the image points RC15, RC16, RC17 and RC18. In the first designation mode, when the image points RC15 and RC16 are consecutively designated by clicking on them with the mouse, three-dimensional coordinates of the connection point RC1 are calculated with respect to the first scene coordinate system $(X_S\text{-}Y_S\text{-}Z_S)$. Also, when the image points RC17 and RC18 are consecutively designated by clicking on them with the mouse, three-dimensional coordinates of the connection point RC1 are calculated with respect to the second scene coordinate system $(X_S'\text{-}Y_S'\text{-}Z_S')$.

When the second designation button KB2 is operated by clicking on it with the mouse, a second designation mode is selected to designate the image points RC25, RC26, RC27 and RC28. In the second designation mode, when the image points RC25 and RC26 are consecutively designated by clicking on them with the mouse, three-dimensional coordinates of the connection point RC2 are calculated with respect to the first scene coordinate system $(X_S\text{-}Y_S\text{-}Z_S)$. Also, when the image points RC27 and RC28 are consecutively designated by clicking on them with the mouse, three-dimensional coordinates of the connection point RC2 are calculated with respect to the second scene coordinate system $(X_S'\text{-}Y_S'\text{-}Z_S')$.

Thus, it is possible to determine not only a relative movement distance of the target TG from the first target position RP1 to the second target position RP2 but also a relative rotational angle of the second scene coordinate system $(X_S'\text{-}Y_S'\text{-}Z_S')$ with respect to the first scene coordinate system $(X_S\text{-}Y_S\text{-}Z_S)$. Of course, the determined movement distance and the determined rotational angle represent the coordinates $(X_{dp}, Z_{dp})$ and the angle of $\xi$, respectively, as explained with reference to FIG. 7. In short, by the designation of the image points (RC15, RC16, RC17 and RC18; and RC25, RC25, RC27 and RC28), the transformation of the second scene coordinate system $(X_S'\text{-}Y_S'\text{-}Z_S')$ into the first scene coordinate system $(X_S\text{-}Y_S\text{-}Z_S)$ is performed on the basis of the above-mentioned formula (4), whereby the photographing positions M7, M8, M9 and M10 are expressed with respect to the first scene coordinate system $(X_S\text{-}Y_S\text{-}Z_S)$, resulting in connection between the first group of pictures and the second group of pictures.

Figure 15:
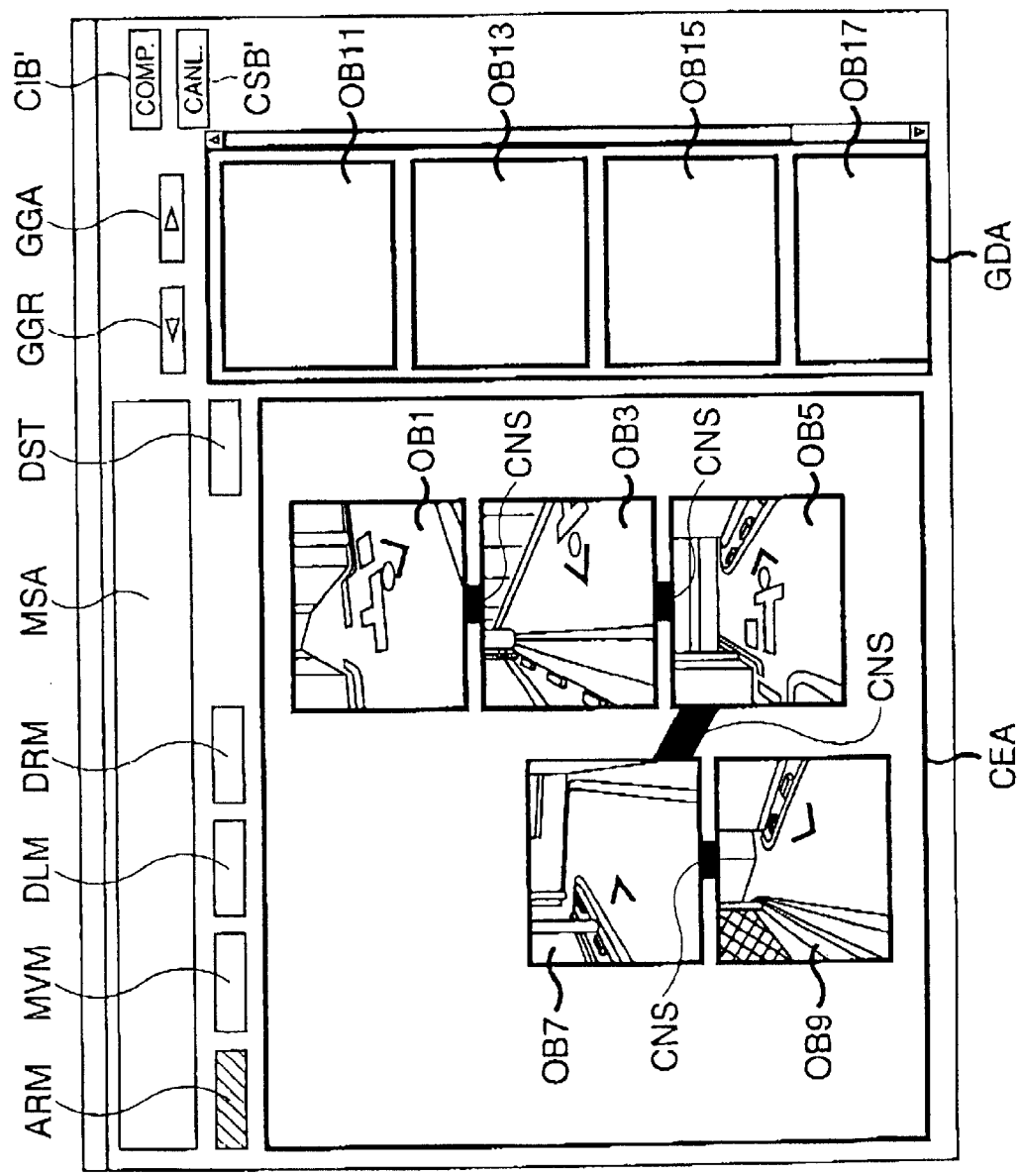
FIG. 15 is a view, similar to FIG. 11, showing the connection-mode scene at yet another aspect different from FIG. 11.

After the designation of the image points (RC15, RC16, RC17 and RC18; and RC25, RC26, RC27 and RC28), when the completion button OFN is operated by clicking on it with the mouse, the scene (FIG. 14) of the monitor 10 is changed into a scene as shown in FIG. 15. As is shown in this drawing, the objects OB7 and OB9 are transferred from the picture-display area GDA to the editing-display area CEA, and the objects OB7 and OB9 are successively connected to the object OB5, included in the first group, by connecting-strips CNS.

In the scene of FIG. 14, when it is perceived that the designation of a pair of image points (RC15 and RC16; RC17 and RC18; RC25 and RC26; RC27 and RC28) is erroneously performed, the designation concerned is canceled by operating the cancel button OCS by clicking on it with the mouse. Thereafter, the designation can be tried again.

As shown in FIG. 15, as soon as the transfer of the objects OB7 and OB9 from the picture-display area GDA to the editing-display area CEA is performed, the part of the pictures included in the third group is displayed on the picture-display area GDA, regardless of the operation oft he advancing button GGA. Namely, the objects OB11, OB13, OB15 and OB17, which correspond to the pictures obtained at the photographing positions M11, M13, M15 and M17, respectively are displayed on the picture-display area GDA.

Note, in FIG. 15 (FIG. 16), each of the objects OB11, OB13, OB15 and OB17 is shown as a blank frame for the sake of convenience.

Similar to the above-mentioned cases, the objects OB11, OB13, OB15 and OB17 can be transferred from the picture-display area GDA to the editing-display area CEA, and can be connected to the second group of the objects in substantially the same manner as explained above with respect to the objects OB7 and OB9 included in the second group.

Figure 16:
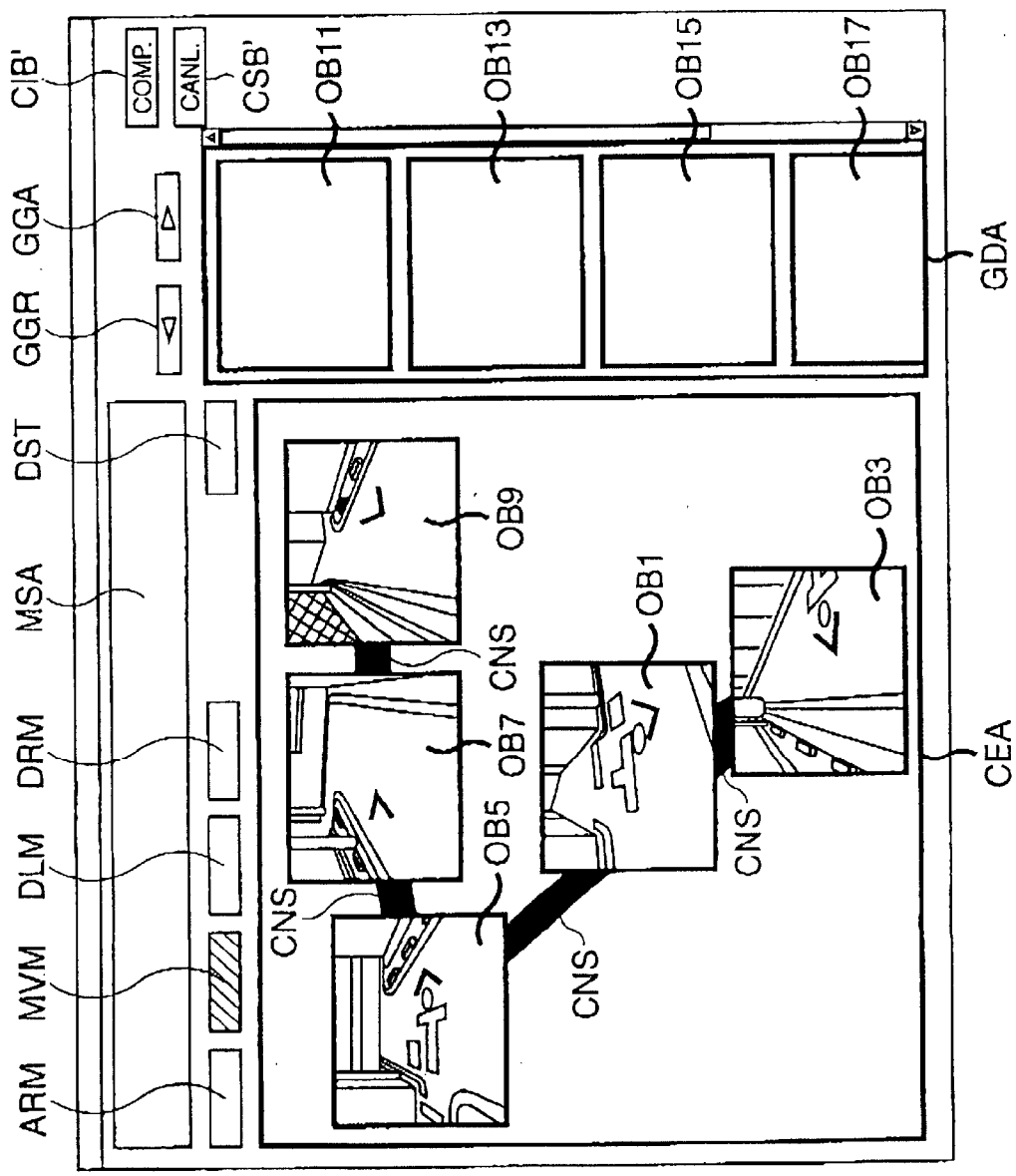
FIG. 16 is a view, similar to FIG. 11, showing the connection-mode scene at yet further another aspect different from FIG. 11.

For example, in the scene of FIG. 15, when the object-arranging mode is selected by operating the object-arranging-mode button MVM by clicking on it with the mouse, the objects OB1, OB3, OB5, OB7 and OB9, connected to each other by the connecting-strips CNS, can be optionally rearranged on the editing-display area CEA, as shown in FIG. 16 in which the operated button MVM is hatched to indicate the setting of the object-arranging mode.

In particular, when one of the objects OB1, OB3, OB5, OB7 and OB9 is indicated by clicking on it with the mouse, the indicated object is encompassed by a single-dot-line frame, just like the object OB5 or OB7 shown in FIG. 13. Then, when the pointer (not shown) is out of the indicated object, a broken-line frame (GM), as shown in FIG. 11 or 13, is displayed on the editing-display area CEA such that the pointer is surrounded by the broken-line frame (GM). When the pointer is moved within the editing-display area CEA by manipulating the mouse, the pointer takes with it the broken-line frame (GM). Thus, the broken-line frame (GM) can be positioned at a given location by the pointer. After the positioning of the broken-line frame (GM), when a clicking operation is performed with the mouse, the indicated object is moved from an original position shown in FIG. 15 to a new position shown in FIG. 16. In this way, the objects OB1, OB3, OB5, OB7 and OB9 shown in FIG. 15 can be rearranged as shown in FIG. 16.

In short, the objects can be optionally arranged on the editing-display area CEA in accordance with an operator's taste or choice. For example, the rearrangement of the objects are performed such that the operator or photographer can be easily reminded of the photographing scenes, resulting in facilitation of the production of the survey map.

Note, it is apparent from FIG. 15 that each of the displayed connecting-strips CNS behave just like a rubber strip connected between the centers of the two adjacent objects at the back faces thereof when each of the object is moved.

Also, note, of course, in the scene in FIG. 12, when the object-arranging mode is set, it is possible to rearrange the objects OB1, OB3 and OB5.

In the scene of FIGS. 15 or 16, when one of the objects OB1, OB3 and OB5 is indicated by clicking on it with the mouse in the object-deleting mode (DLM), all the objects OB1, OB3 and OB5 are deleted from the editing-display area, and are then returned to the picture-display are GDA. Similarly, when one of the objects OB7 and OB9 is indicated by clicking on it with the mouse, both the objects OB7 and OB9 are deleted from the editing-display area CEA, and are then returned to the picture-display are GDA.

Note, the first group of objects OB1, OB3 and OB5, the second group of objects OB7 and OB9, and the third objects OB11, OB13, OB15 and OB17 are displayed on only one of the picture-display area GDA and the editing-displayed area CEA. Namely, each of the first, second and third groups cannot be simultaneously displayed on both the picture-display area GDA and the editing-displayed area CEA.

The scenes of the monitor 10, shown in FIGS. 11, 12, 13, 15 and 16, include a setting-menu-display area MSA which is associated with a setting-alteration button DST and a setting-fixing button DRM displayed thereon. When the button DST is operated by clicking on it with the mouse, various setting-menus are displayed on the setting-menu-display area MSA. Among the setting-menus, for example, there are a size-altering menu for altering a size of an object (OB1 to OB17) to be displayed, and a connecting-strip-altering menu for altering a width, a color or the like of a connecting-strip (CNS) to be displayed. Each of the setting-menus has various setting-items, and an alteration of a setting is performed by indicating a corresponding setting-item by clicking on it with the mouse. After the alteration of the setting is completed, when the setting-fixing button DRM is operated by clicking on it with the mouse, the alteration of the setting is fixed, and the setting-menus disappear from the setting-menu-display area MSA.

Further, on the scenes shown in FIGS. 11, 12, 13, 15 and 16, a completion button CIB' and a cancel button CSB' are displayed. After the objects (OB1 to OB17) are successively connected to each other, when the completion button CIB' is operated by clicking on it with the mouse, the connection data between the objects (OB1 to OB17) are stored in the working memory 19 or the hard disc provided in the image processing computer system, and the picture-connecting-mode scene of the monitor 10 is returned to the initial menu scene. Also, whenever the cancel button CSB' is operated by clicking on it with the mouse, a processing concerned for connecting objects to each other is canceled.

Figure 17:
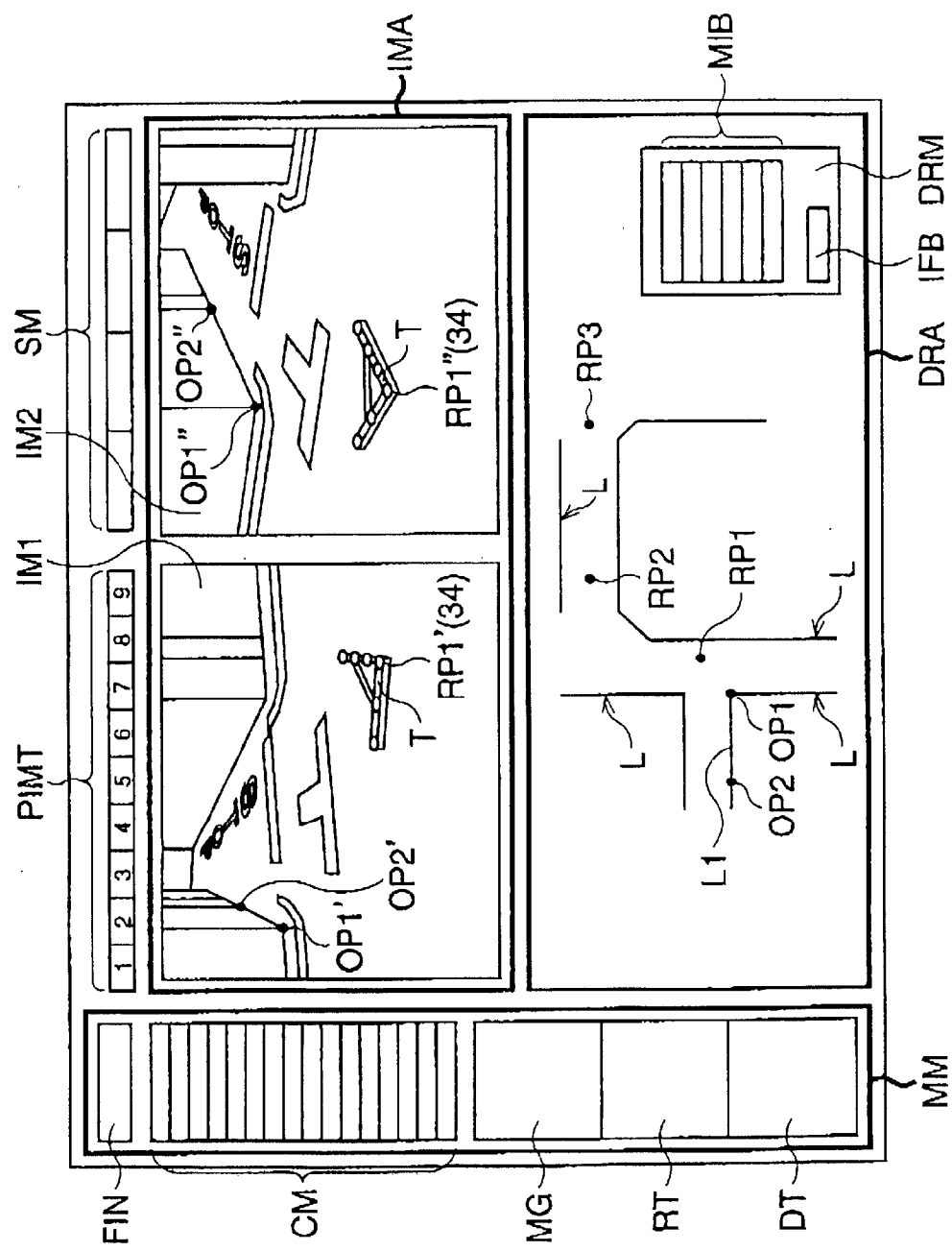
FIG. 17 is a view showing a map-production-mode scene of the monitor.

FIG. 17 shows, by way of example, a map-production-mode scene of the monitor 10 on which a map-production-processing for producing the survey map based on the nine pairs of pictures, successively connected to each other as mentioned above, is executed. Similar to the aforesaid cases, the map-production-mode scene is also selected from the initial menu scene displayed on the monitor 10.

As shown in FIG. 17, the map-production-mode scene includes a pair-picture-display area IMA, a map-production-display area DRA positioned below the pair-picture-display area IMA, and a main-menu-display area MM positioned on the left side of the display area IMA and DRA. The map-production-mode scene further includes a tag-bar PIMT and a submenu-bar SM display along the top of the pair-picture-display area IMA. Ad is apparent from FIG. 17, the tag-bar PIMT includes plural tag-buttons aligned with each other, and the submenu bar SM includes plural submenu-buttons aligned with each other.

On the pair-picture-display area IMA, two pictures are displayed in each pair for producing a survey map section. In the example of FIG. 17, although the two pictures in the first pair, indicated by references IM1 and IM2, are displayed side by side on the pair-picture-display area IMA, two pictures to be displayed on the display area IMA are optionally selected by operating one of the tag-buttons by clicking on it with the mouse.

In particular, a number of the tag-buttons included in the displayed tag-bar PIMT depends on the number of the pairs of pictures. In this embodiments, since there are the nine pairs of pictures, the number of the tag-buttons is nine, and numerals "1" to "9" are orderly displayed on the nine tag-buttons. Of course, the numerals "1" to "9" correspond to the first, second, third, fourth, fifth, sixth, seventh, eighth and ninth pairs of pictures, respectively. When the tag-button having the displayed numeral "1" is operated by clicking on it with the mouse, the first pair of pictures IM1 and IM2 is displayed on the pair-picture-display area IMA, as shown in FIG. 17.

Note, the operated tag-button is displayed as if being depressed, whereby it is possible to visually confirm whether each of the tag-buttons is operated.

In the example of FIG. 17, an unfinished survey map is displayed on the map-production-display area DRA OF course, the survey-map is produced based on the nine pairs of pictures. Note, the target positions RP1, RP2 and RP3, each of which is represented by the reference point 34 of the target TG, may be optionally displayed on the display area DRA at the beginning of the production of the survey map.

As already stated hereinbefore, a first survey map section of the displayed survey may is produced based on the first pair of pictures IM1 and IM2. In particular, when two object points, corresponding to each other on the pictures IM1 and IM2, are consecutively indicated by clicking on them with the mouse, three-dimensional coordinates of an object point, represented by the photographed object points, are calculated with respect to the first scene coordinate system ($X_S$-$Y_S$-$Z_S$). Then, the calculated coordinates of the object point concerned is projected on the plane defined by the $Z_S$- and $Z_S$-axis of the first scene coordinate system ($S_S$-$Y_S$-$Z_S$), thereby producing the first survey map section based on the first pair of pictures IM1 and IM2.

For example, an object point OP1, shown on the survey map, corresponds to a photographed object point OP1' on the first picture IM1, and corresponds to a photographed object points OP1" on the second picture IM2. By indicating the photographed object points OP1' and OP1" by clicking on them with the mouse, the object point OP1 is determined on the map-production-display area DRA. Similarly, an object point OP2, corresponding to respective photographed points OP2' and OP OP2" on the pictures IM1 and IM2, is determined on the map-production-display are DRA.

Note, in reality, an indicated object point (OP1, OP2, OP1', OP1", OP2', OP2") is represented by a colored small dot displayed on a corresponding picture.

After the determination of the two object points OP1 and OP2, a line segment L1 is drawn and displayed between the object points OP1 and OP2, as shown in FIG. 17. The drawing of the line segment L1 is performed by previously selecting and setting a straight-line-drawing mode in a drawing-menu window DRM displayed on the map-production-display area DRA.

The drawing-menu window DRM has plural item-buttons, representatively indicated by reference MIB, which correspond to various line-drawing modes. Of course, one of the line-drawing modes is the aforesaid straight-line-drawing mode, and other modes may be a curved-line-drawing mode, a diameter-designated-circular-drawing mode, a radius-designated-circular-drawing mode, a polygon-drawing mode and so on. Of course, one of the line-drawing mode is selected and set by operating a corresponding item button MIB by clicking on it with the mouse. The drawing-menu window DRM further has an input-fixing button IFB, which is operated by clicking on it with the mouse after object points necessary for drawing a line segment or line segments are displayed on the display area DRA.

In the above-mentioned example, after the object points OP1 and OP2 are displayed on the map-production-display area DRA, the drawing of the line-segment L1 between the displayed object points OP1 and OP2 is performed by the operation of the input-fixing button IFB provided that the straight-line-drawing mode is selected and set.

Thus, as shown in FIG. 17, it is possible to draw and display lines L, representing the roadway, on the display area DRA by repeating indication of plural pairs of objects points, representing the roadway and corresponding to each other on the pictures IM1 and IM2.

The main-menu-display area MM includes various command-item buttons, representatively indicated by reference CM, and each of the command-item buttons it operated by clicking on it with the mouse. By selectively operating the command-item buttons CM, a corresponding command mode is selected and set.

For example, when a map-drawing-command mode is selected, the aforesaid processing for the production of the survey map section is enabled. When a map-symbol-inputting-command mode is selected, a selection of a given map symbol from a previously-prepared map symbol list and an addition of the selected map symbol to the survey map are enabled. When a user-symbol-inputting-command mode is selected, a selection of a given symbol from a user-previously-prepared symbol list and an addition of the selected symbol to the survey map are enabled.

Also, when a character-inputting-command mode is selected, it is possible to add characters to the survey map by inputting character codes through the keyboard of the input device 12. Of course, when the character code data is input, the character code data is converted into character image data, which is output to the display memory 20, whereby character images are displayed on the map-production-display area DRA. When a measurement-command mode is selected, it is possible to calculate a distance between two locations, indicated with the mouse, based on the standard distance LT (FIG. 5) defined by the target TG. When a map-editing-command mode is selected, it is possible to suitably edit the survey map, symbols and characters displayed on the display area DRA. When a map-correcting-command mode is selected, it is possible to suitably correct a part of the displayed survey map. When a printing-command mode is selected, it is possible to print the displayed survey map on a sheet of paper by a printer (not shown) connected to the image-processing computer system. When a map-preserving-command mode is selected, it is possible to store survey map data representing the display survey map in the hard disc of the image-processing computer system.

Further, one of the command-item buttons CM is used as a canceling-button. When a processing is erroneously performed during one of various aspects of the production of the survey map, the erroneous processing can be canceled by clicking the cancel button with the mouse. Another of the command-item buttons CM is used as a deleting-button, and it is possible to suitably delete a part of the displayed survey map by clicking the deleting-button with the mouse.

The main-menu-display area MM also includes three setting-menu sections MG, RT and DT. The setting-menu section MG is provided for altering a setting of a power-magnification of the displayed survey map. The setting-menu section RT is provided for altering a setting of a rotational display-position of the survey map. The setting-menu section DT is provided for altering settings of a type, a thickness, a color or the like of a drawing-line.

Further, the main-menu-display area MM includes a finish button FIN. Whenever the finish button FIN is operated by clicking on it with the mouse, the map-preserving-command mode is forcibly selected, and it is determined whether the displayed survey map should be stored and preserved in the hard disc of the image-processing computer system. In any events, after one of the two ways is selected, the map-production-display mode (FIG. 17) of the monitor 10 is returned to the initial menu scene.

One of the submenu-buttons of the aforesaid submenu bar SM is provided for altering a title data of each picture. As already mentioned above, each of the eighteen pictures carries a title data stored in a subheader areas H1 of a corresponding memory-area section of the memory card 13. When the submenu button concerned is operated by clicking on it with the mouse, a title-altering mode is selected for suitably altering a title data of each picture. Also, the other submenu-buttons of the submenu bar SM are provided for resetting previously-given various settings.

Figure 18:
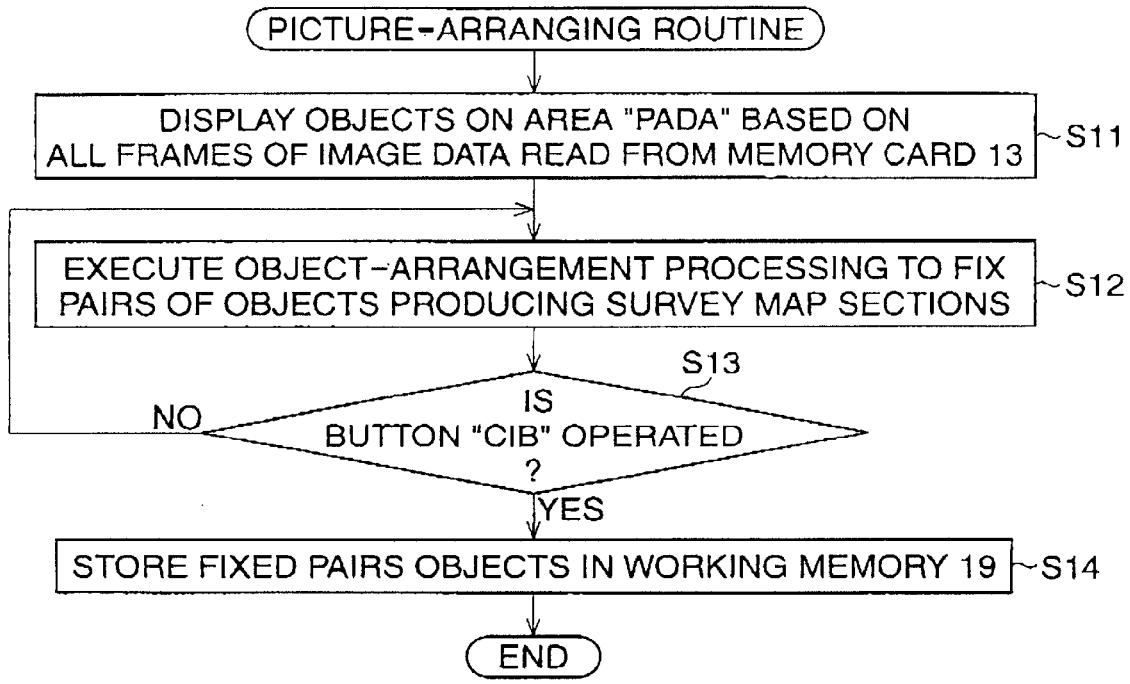
FIG. 18 is a flowchart for a picture-arranging routine executed in the photogrammetric image processing computer system according to the present invention.

FIG. 18 shows a flowchart for a picture-arranging routine, which is executed when the picture-arranging-mode scene is selected from the initial menu scene of the monitor 10, as shown in FIGS. 8 or 9.

At step S11, objects are displayed on the picture-arranging-display area PADA (FIG. 9) based on all frames of image data read from the memory card 13. Then, at step S12, an object-arrangement processing for rearranging the displayed objects is executed to fix plural pairs of objects (OB1 and OB2; OB3 and OB4; . . . OB15 and OB16; and OB17 and OB18) for producing survey map sections, respectively, as explained with respect to FIGS. 9 and 10.

At step S13, it is monitored whether the completion button CIB (FIGS. 8, 9 and 10) is operated by clicking on it with the mouse. When the operation of the button CIB is not confirmed, the control returns to step S12, and thus the execution of the object-arrangement processing is continued.

At step S13, when the operation of the button CIB is confirmed, the control proceeds to step S14, in which the fixed pairs of objects are stored in the working memory 19. Thus, the picture-arranging routine ends, and the picture-arranging-mode scene of the monitor 10 is returned to the initial menu scene.

Figure 19:
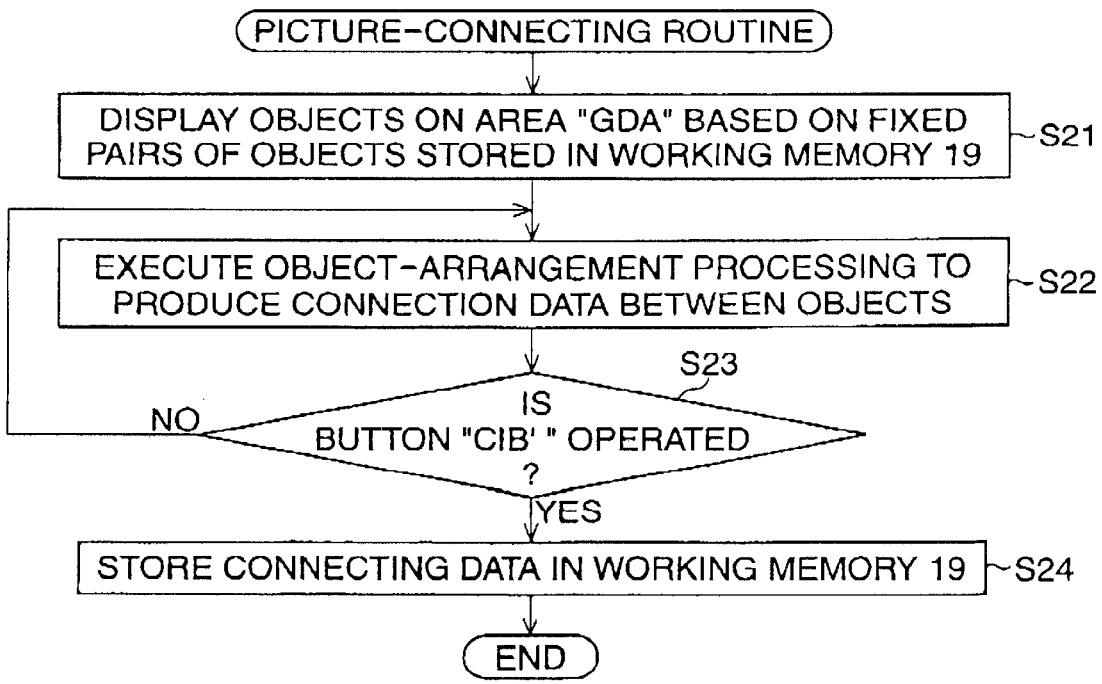
FIG. 19 is a flowchart for a picture-connecting routine executed in the photogrammetric image processing computer system according to the present invention.

FIG. 19 shows a flowchart for a picture-connecting routine, which is executed when the picture-connecting-mode scene is selected from the initial menu scene of the monitor 10, as shown in FIG. 11.

At step S21, objects are displayed on the picture-display area GDA (FIG. 11) based on the fixed plural pairs of objects stored in the working memory 19. Then, at step S22, an object-connection processing for connecting the objects to each other is executed, thereby producing connection data between the objects (OB1, OB3, OB5, OB7, OB9, OB11, OB13, OB15 and OB17), as explained with respect to FIGS. 11 to 16.

At step S23, it is monitored whether the completion button CIB' (FIGS. 11 to 13, 15 and 16) is operated by clicking on it with the mouse. When the operation of the button CIB' is not confirmed, the control returns to step S22, and thus the execution of the object-connection processing is continued.

At step S23, when the operation of the button CIB' is confirmed, the control proceeds to step S24, in which the connection data between the objects are stored in the working memory 19. Then, the picture-connecting routine ends, and the picture-connecting-mode scene of the monitor 10 is returned to the initial menu scene.

Figure 20:
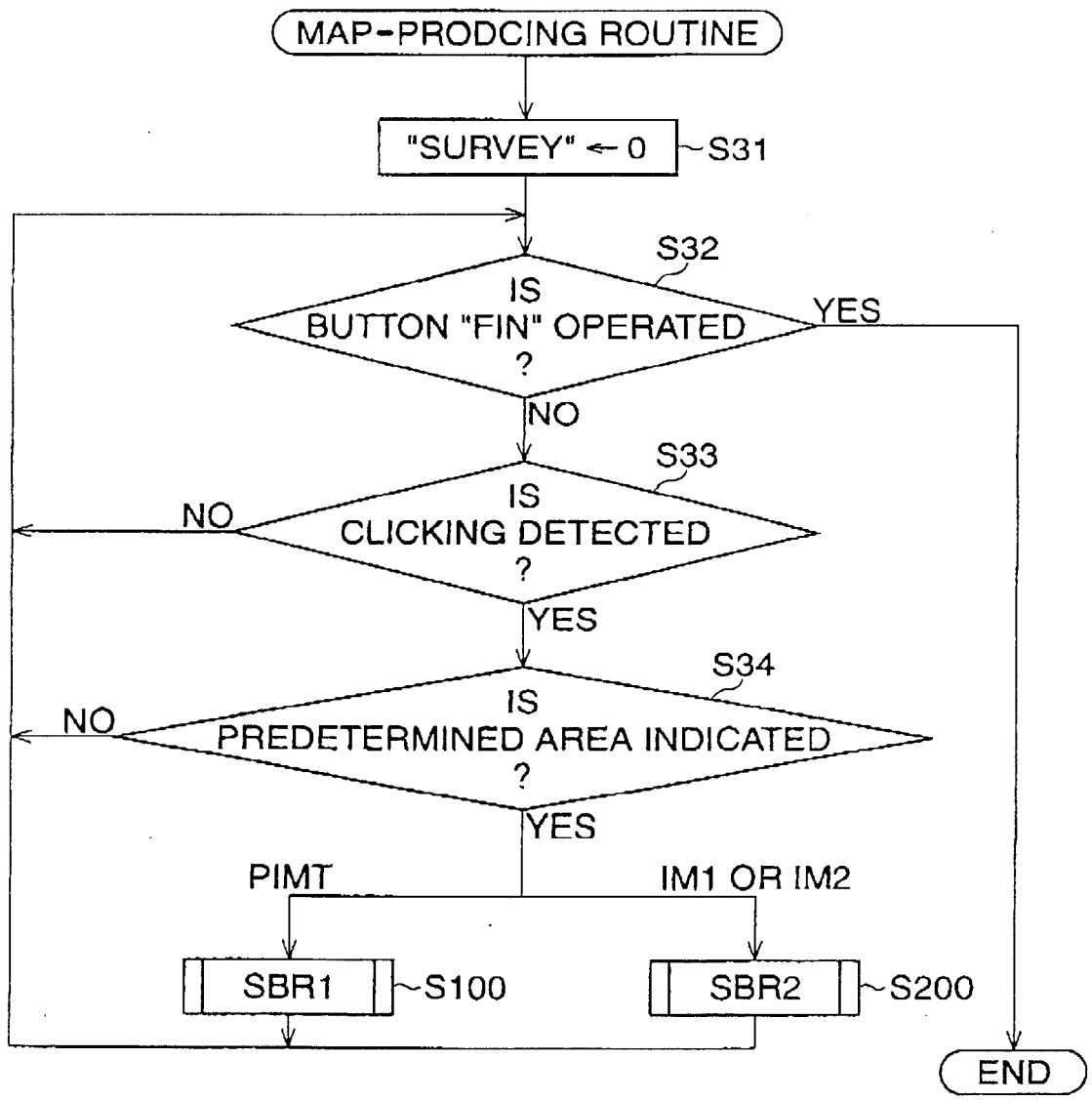
FIG. 20 is a flowchart for a map-producing routine executed in the photogrammetric image processing computer system according to the present invention.

FIG. 20 shows a flowchart for a map-producing routine, which is executed when the map-drawing-command mode is selected and set after the map-production-mode scene (FIG. 17) is selected from the initial menu scene of the monitor 10.

At step S31, a variable "SURVEY" is initialized to be "0". Then, at step S32, it is monitored whether the finish-button FIN is operated by clicking on it with the mouse. When the operation of the finish-button FIN is confirmed, the map-producing routine immediately ends.

At step S32, when the operation of the finish-button FIN is not confirmed, the control proceeds to step S33, in which it is monitored whether a clicking operation is performed with the mouse. When the clicking operation is not confirmed, the control returns to step S32.

At step S33, when the clicking operation is confirmed, the control proceeds to step S34, in which it is determined whether the pointed is in a predetermined area during the performance of the clicking operation.

At step S34, when the aforesaid predetermined area is the tag-bar PIMT, the control proceeds to step S100, in which a subroutine SBR1 is executed. Note, the subroutine SBR1 is explained in detail with reference to FIG. 21 hereinafter.

At step S34, when the aforesaid predetermined area is one of the two pictures (IM1 and IM2) displayed on the pair-picture-display area IMA, the control proceeds to step S200, in which a subroutine SBR2 is executed. Note, the subroutine SBR2 is explained in detail with reference to FIG. 22 hereinafter.

Note, at step S34, when it is not confirmed that the pointed is in any one of the aforesaid predetermined areas during the performance of the clicking operation, the control returns to step S32.

Figure 21:
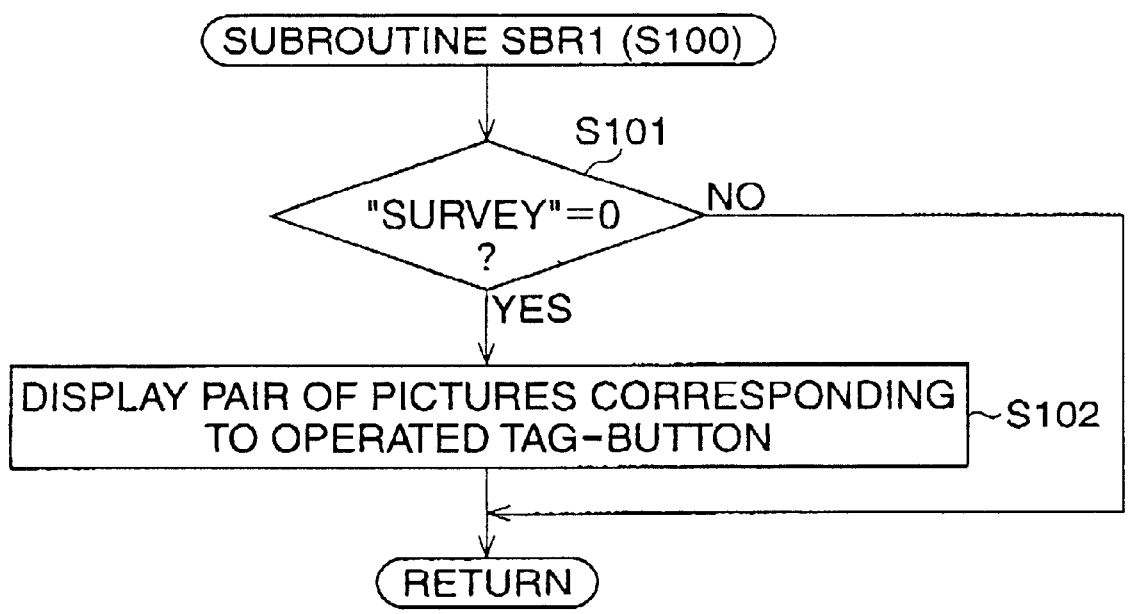
FIG. 21 is a flowchart for a subroutine executed in step S100 of the map-producing routine of FIG. 20.

FIG. 21 shows a flowchart for the subroutine SBR1 executed at step S100 of the map-producing routine shown in FIG. 20. Of course, the execution of the subroutine SBR1 is started when the clicking operation is performed provided that the pointer is in the tag-bar PIMT.

At step S101, it is determined whether a variable "SURVEY" is "0". The variable "SURVEY" has one of numerical values "0", "1" and "2". As mentioned hereinafter, when the clicking-operation is performed to indicate an object point (OP1' or OP2') on the left side picture (IM1) displayed on the pair-picture-display area IMA, a setting of "1" is given to the variable "SURVEY", and, when the clicking-operation is performed to indicate an object point (OP1" or OP2") on the right side picture (IM2) displayed on the pair-picture-display area IMA, a setting of "2", is given to the variable "SURVEY".

Thus, while the indication of object points (OP1', OP2'; OP1" or OP2") is performed for a determination of three-dimensional coordinates of an object point (OP1, OP2), either the setting of "1" or "2" is given to the variable "SURVEY". Note, when the determination of the three-dimensional coordinates of the object point (OP1, OP2) is once completed, i.e. when none of object points is indicated, the initial setting of "0" is given to the variable "SURVEY".

At step S101, if SURVEY=0, the control proceeds to step S102, in which a pair of pictures corresponding to an operated tag-button is displayed on the pair-picture-display area IMA. For example, when the tag-button having numeral "1" is initially operated by clicking on it with the mouse, the first pair of pictures IM1 and IM2 corresponding to the tag-button of "1" is displayed on the pair-picture-display area IMA, as shown in FIG. 17.

At step S101, if SURVEY 0, i.e. if the determination of the three-dimensional coordinates of the object point (OP1, OP2) is not completed, the subroutine SBR1 once ends. Namely, although the pointer is the tag-bar PIMT, the clicking operation concerned is ignored when the variable "SURVEY" is not "0".

Figure 22:
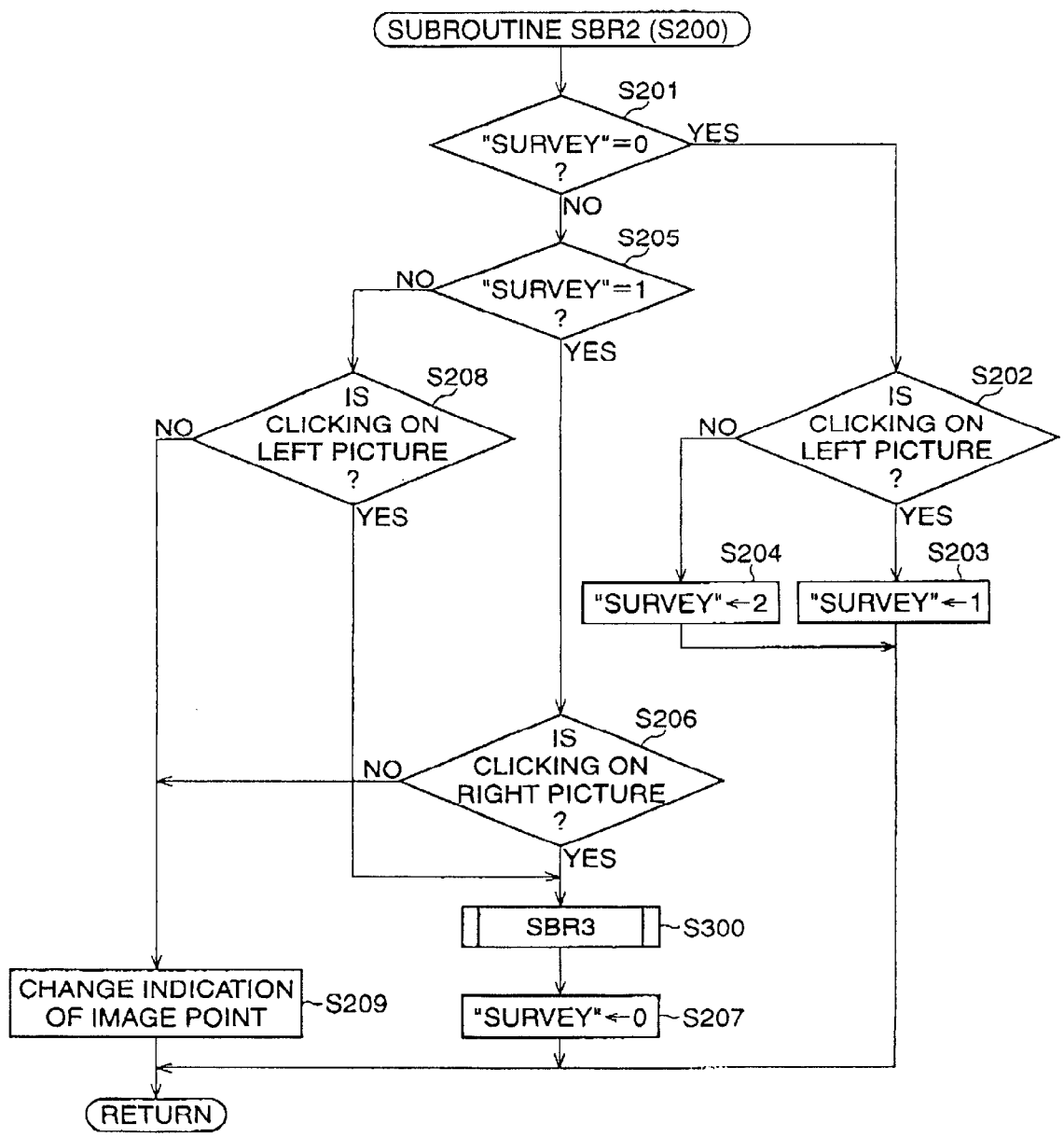
FIG. 22 is a flowchart for a subroutine executed in step S200 of the map-producing routine of FIG. 20.

FIG. 22 shows a flowchart for the subroutine SBR2 executed at step S200 of the map-producing routine shown in FIG. 20. Of course, the execution of the subroutine SBR2 is started when the clicking operation is performed provided that the pointer is in one of the two pictures displayed on the pair-picture-display area IMA.

At step S201, it is determined whether the variable "SURVEY" is "0". If SURVEY=0, the control proceeds to step S202, in which it is determined whether the clicking-operation concerned is performed on the left picture (IM1) displayed on the pair-picture-display area IMA.

When it is confirmed that the clicking-operation concerned is performed on the left picture (IM1), the control proceeds to step S203, in which a setting of "1" is given to the variable "SURVEY". At this time, an object point (OP1', OP2') indicated by the clicking operation concerned is represented by a colored small dot on the left picture (IM1).

At step S202, when it is not confirmed that the clicking-operation concerned is performed on the left picture (IM1), i.e. when the clicking-operation concerned is performed on the right picture (IM2), the control proceeds to step S204, in which a setting of "2" is given to the variable "SURVEY". At this time, an object point (OP1", OP2") indicated by the clicking operation concerned is represented by a colored small dot on the right picture (IM2).

At step S201, if SURVEY 0, the control proceeds to step S205, in which it is determined whether the variable "SURVEY" is "1". If SURVEY=1, i.e. if the indication of the object point (OP1', OP2') on the left picture (IM1) is already completed, the control proceeds to step S206, in which it is determined whether the clicking-operation concerned is performed on the right picture (IM2) displayed on the pair-picture-display area IMA. When it is confirmed that the clicking-operation concerned is performed on the right picture (IM2), i.e. when the consecutive indications of the object points (OP1', OP2'; OP1", OP2") corresponding to each other are performed, the control proceeds to step S300, in which a subroutine SBR3 is executed to determine three-dimensional coordinates of an object point (OP1, OP2) represented by the indicated object points (OP1', OP2'; OP1", OP2"). Note, the subroutine SBR3 is explained in detail with reference to FIG. 21 hereinafter.

After the execution of the subroutine SBR3, the control proceeds to step S207, in which the variable "SURVEY" is reset to be "0". Then, the subroutine SBR2 once ends.

At step S206, when it is not confirmed that the clicking-operation concerned is performed on the right picture (IM2); i.e. when the two clicking-operations are consecutively performed on the left picture (IM1), the control proceeds from step S206 to step S209, in which the indication of object point is changed on the left picture (IM1). Namely, the earlier clicking-operation is canceled, and an object point indicated by the later clicking-operation is dealt with as a properly-indicated object point on the left picture (IM1).

At step S206, if SURVEY 1, i.e. if the indication of the object point (OP1", OP2") on the right picture (IM2) is already completed (SURVEY=2), the control proceeds to step S208, in which it is determined whether the clicking-operation concerned is performed on the left picture (IM1) displayed on the pair-picture-display area IMA. When it is confirmed that the clicking-operation concerned is performed on the left picture (IM1), i.e. when the consecutive indications of the object points (OP1', OP2'; OP1", OP2") corresponding to each other are performed, the control proceeds to step S300, in which the subroutine SBR3 is executed to determine three-dimensional coordinates of an object point (OP1, OP2) represented by the indicated object points (OP1', OP2'; OP1", OP2").

After the execution of the subroutine SBR3, the control proceeds the step S207, in which the variable "SURVEY" is reset to be "0". Then, the subroutine SBR2 once ends.

At step S208, when it is not confirmed that the clicking-operation concerned is performed on the left picture (IM1), i.e. when the two clicking-operations are consecutively performed on the right picture (IM2), the control proceeds from step S208 to step S209, in which the indication of object point is changed on the right picture (IM2). Namely, the earlier clicking-operation is canceled, and an object point indicated by the later clicking-operation is dealt with as a properly-indicated object point on the right picture (IM2).

Figure 23:
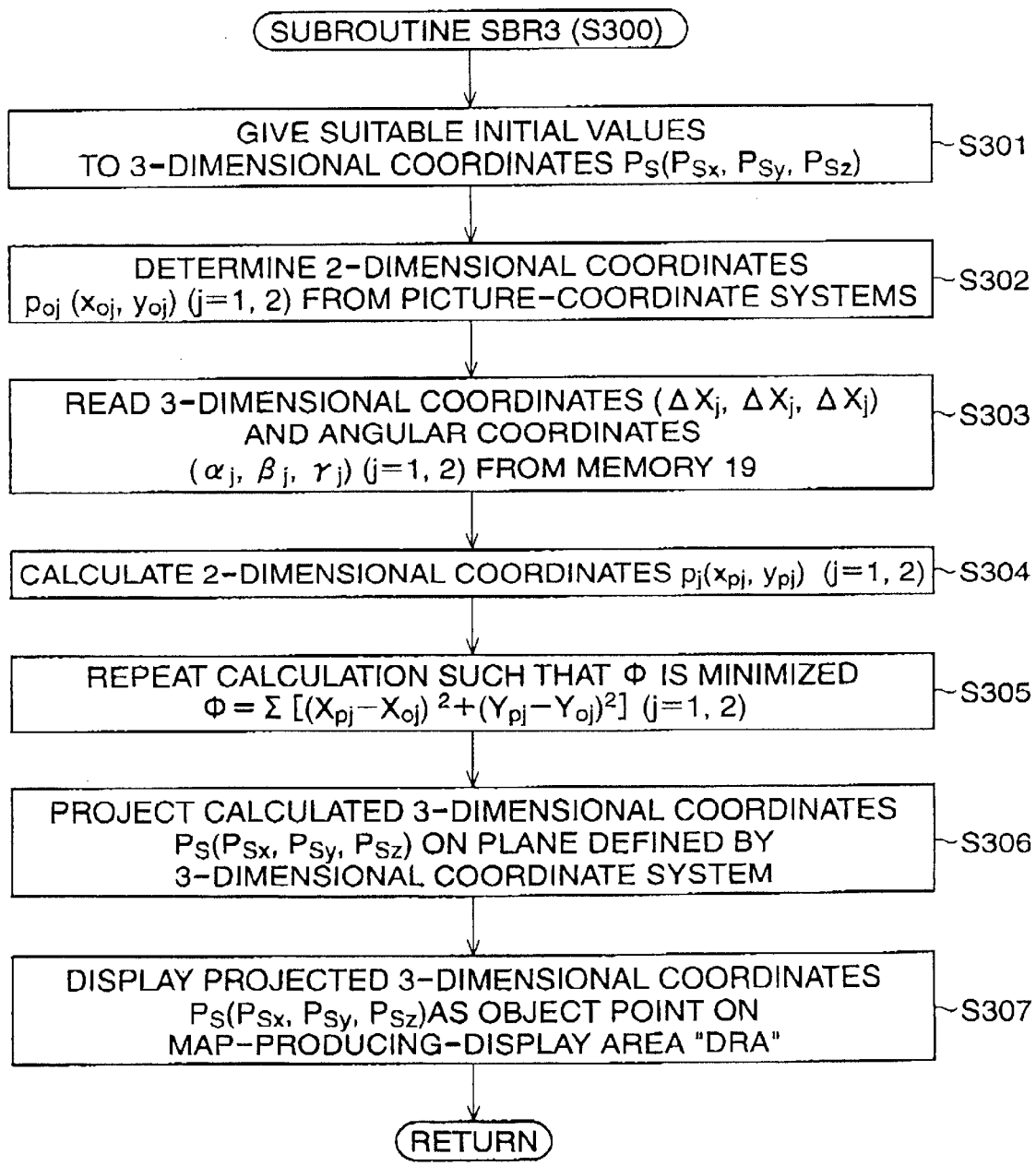
FIG. 23 is a flowchart for a subroutine executed in step S300 of the subroutine of FIG. 22.

FIG. 23 shows a flowchart for the subroutine SBR3 executed at step S300 of the subroutine SBR2 shown in FIG. 22.

At step S301, respective suitable initial values are given to three-dimensional coordinates $P_{si}(P_{sxi}, P_{syi}, P_{szi})$ of the object point (OP1, OP2) represented by the indicated object points (OP1', OP2'; OP1", OP2") on the left and right pictures (IM1, IM2). Note, of course, the three-dimensional coordinates $P_{si}(P_{sxi}, P_{syi}, P_{szi})$ is based on the first-scene coordinate system ($X_S$-$Y_S$-$Z_S$).

At step S302, the pair of two-dimensional coordinates $P_{o1}(x_{o1}, Y_{o1})$ of the indicated object point (OP1', OP2') and two-dimensional coordinates $p_{o2}(x_{o2}, y_{o2})$ of the indicated object point (OP1", OP2") are determined with respect to the picture-coordinate systems ($X_p$-$X_p$) defined on the left and right pictures IM1 and IM2, respectively.

At step S303, the three-dimensional coordinates $M_1)"X_1$, $\Delta Y_1$, $\Delta Z_1$) and three-dimensional angular coordinates ($\alpha_1$, $\beta_1$, $\gamma_1$) and the three-dimensional coordinates $M_2(\Delta X_2, \Delta Y_2, \Delta Z_2)$ and three-dimensional angular coordinates ($\alpha_2$, $\beta_2$, $\gamma_2$), which represent the photographing position M1 (IM1) and M2 (IM2), respectively, are read from the working memory 19. Note, of course, these coordinates are based on the first-scene coordinate system ($X_S$-$Y_S$-$Z_S$).

At step S304, a pair of two-dimensional coordinates $p_1(x_{p1}, y_{p1})$ and two-dimensional coordinates $p_2(x_{p2}, y_{p2})$ is calculated based on the three-dimensional coordinates $P_{si}(P_{sxi}, P_{syi}, P_{szi})$ having the suitable initial values, the three-dimensional coordinates $M_1(\Delta X_1, \Delta Y_1, \Delta Z_1)$ and three-dimensional angular coordinates ($\alpha_1$, $\beta_1$, $\gamma_1$), and the three-dimensional coordinates $M_2(\Delta X_2, \Delta Y_2, \Delta Z_2)$ and three-dimensional angular coordinates ($\alpha_2$, $\beta_2$, $\gamma_2$), using the above-mentioned formulas (1), (2) and (3). Note, the calculated respective coordinates $p_1(x_{p1}, y_{p1})$ and $p_2(x_{p2}, y_{p2})$ correspond to the coordinates $p_{o1}(x_{o1}, y_{o1})$ and $p_{o2}(x_{o2}, y_{o2})$ determined at step 302.

At step S305, the calculation is repeated by renewing the values of the three-dimensional coordinates $P_{si}(P_{sxi}, P_{syi}, P_{szi})$, such that a value $\Phi$ of the following formula (5) is minimized:

$$\Phi = \Sigma[(p_{pj}-x_{oj})^2 + (y_{pj}-y_{oj})^2](j=1, 2) \quad (5)$$

Namely, the three-dimensional coordinates $P_{si}(P_{sxi}, P_{syi}, P_{szi})$ of the object point (OP1, OP2), represented by the indicated object points (OP1', OP2'; OP1", OP2"), are calculated using a sequential-approximation method.

At step S306, the calculated coordinates $P_{si}(P_{sxi}, P_{syi}, P_{szi})$ is projected on the plane defined by the $X_S$- and $Z_S$-axes of the first-scene coordinate system ($X_S$-$Y_S$-$Z_S$).

At step S307, the projected coordinates $P_{si}(P_{sxi}, P_{syi}, P_{szi})$ is displayed as a point representing the object point (OP1, OP2) concerned on the map-producing-display area DRA.

Thus, it is possible to effectively and easily produce the survey map on the map-producing-display area DRA, as shown in FIG. 17.

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 11-192940 (filed on Jul. 7, 1999), which is expressly incorporated herein, by reference, in its entirety.

What is claimed is:

1. An image processing computer system for a photogrammetric analytical measurement in which a survey map is produced based on plural pictures under a common three-dimensional coordinate system defined on a target, said computer system comprising:

a picture-arranging system that rearranges said pictures to select plural pairs of pictures from among said pictures such that each pair of pictures is fixed to produce a survey map section;

a picture-connecting system that successively connects said plural pair pictures to each other in a predetermined order;

a monitor that displays a scene including a pair-picture-display area and a map-production-display area;

a first monitor controller that selectively displays said plural pairs of pictures on said pair-picture-display area;

an object-point indicator that indicates a pair of object points corresponding to each other on two pictures in each pair displayed on said pair-picture-display area;

a calculator that calculate three-dimensional coordinate of an object point represented by the pair of object points indicated by said object-point indicator;

a projector that projects the calculated three-dimensional coordinates on a plane defined by two coordinate axes of said three-dimensional coordinate system; and a second monitor controller that displays the projected three-dimensional coordinates as a point representing said object point concerned on said map-producing-display area.

2. An image processing computer system as set forth in claim 1, wherein the scene of said monitor further includes a selection bar for selecting one of said plural pairs of pictures to be displayed on said pair-picture-display area.

3. An image processing method for a photogrammetric analytical measurement in which a survey map is produced based on plural pictures under a common three-dimensional coordinate system defined on a target, said method comprising the steps of:

rearranging said pictures to select plural pairs of pictures from among said pictures such that each pair of pictures is fixed to produce a survey map section under a picture-arranging system;

successively connecting said plural pair pictures to each other in a predetermined order under a picture-connecting system;

displaying a scene, including a pair-picture-display area and a map-production-display area, on a monitor;

selectively displaying said plural pairs of pictures on said pair-picture-display area under a first monitor controller;

indicating a pair of object points corresponding to each other on two pictures in each pair displayed on said pair-picture-display area, using an object-point indicator;

calculating three-dimensional coordinates of an object point represented by the pair of object points indicated by said object-point indicator, using a calculator;

projecting the calculated three-dimensional coordinates on a plane defined by two coordinate axes of said three-dimensional coordinate system, using a projector; and displaying the projected three-dimensional coordinates as a point representing said object point concerned on said map-producing-display area, under control of a second monitor controller.

4. A memory medium storing an image processing program for a photogrammetric analytical measurement in which a survey map is produced based on plural pictures under a common three-dimensional coordinate system defined on a target, said program comprising the steps of:

rearranging said pictures to select plural pairs of pictures from among said pictures such that each pair of pictures is fixed to produce a survey map section under a picture-arranging system;

successively connecting said plural pair pictures to each other in a predetermined order under a picture-connecting system;

displaying a scene, including a pair-picture-display area and a map-production-display area, on a monitor;

selectively displaying said plural pairs of pictures on said pair-picture-display area under a first monitor controller;

indicating a pair of object points corresponding to each other on two pictures in each pair displayed on said pair-picture-display area, using an object-point indicator;

calculating three-dimensional coordinates of an object point represented by the pair of object points indicated by said object-point indicator, using a calculator;

projecting the calculated three-dimensional coordinates on a plane defined by two coordinates axes of said three-dimensional coordinate system, using a projector; and displaying the projected three-dimensional coordinates as a point representing said object point concerned on said map-producing-display area, under control of a second monitor controller.

* * * * *